US012795238B2

(12) United States Patent
Hwang et al.

(10) Patent No.: US 12,795,238 B2
(45) Date of Patent: Nov. 10, 2026

(54) CAMERA MODULE AND ELECTRONIC DEVICE HAVING SAME

(71) Applicant: SAMSUNG ELECTRONICS CO., LTD., Suwon-si (KR)

(72) Inventors: Youngjae Hwang, Suwon-si (KR); Hyunho Yu, Suwon-si (KR); Kwangseok Byon, Suwon-si (KR); Youngbok Yu, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 508 days.

(21) Appl. No.: 17/819,573

(22) Filed: Aug. 12, 2022

(65) Prior Publication Data

US 2022/0385822 A1 Dec. 1, 2022

Related U.S. Application Data

(63) Continuation of application No. PCT/KR2021/019454, filed on Dec. 21, 2021.

(30) Foreign Application Priority Data

Dec. 21, 2020 (KR) ........................ 10-2020-0179888

(51) Int. Cl.
*G02B 7/09* (2021.01)
*H04N 5/225* (2006.01)
(Continued)

(52) U.S. Cl.
CPC ............. *H04N 23/687* (2023.01); *G02B 7/09* (2013.01); *H04N 23/54* (2023.01); *H04N 23/57* (2023.01)

(58) Field of Classification Search
CPC . G02B 7/021; G02B 7/08; G02B 7/09; G02B 7/10; G02B 9/62; G02B 13/001;
(Continued)

(56) References Cited

U.S. PATENT DOCUMENTS

| | | | |
|---|---|---|---|
| 9,091,802 | B2 | 7/2015 | Lee et al. |
| 9,438,801 | B2 | 9/2016 | Hwang et al. |

(Continued)

FOREIGN PATENT DOCUMENTS

| | | | |
|---|---|---|---|
| JP | 2021-139949 | A | 9/2021 |
| KR | 20-2011-0008714 | U | 9/2011 |

(Continued)

OTHER PUBLICATIONS

Lee et al. KR 20200004490 A English language Machine translation (Year: 2020).*

(Continued)

*Primary Examiner* — Marin Pichler

(57) ABSTRACT

An electronic device may include a housing, a lens assembly disposed in the housing, a first carrier operatively connected to the lens assembly to move the lens assembly in an optical axis direction, wherein the first carrier includes a first yoke part and a second yoke part, a second carrier operatively connected to the lens assembly to move the lens assembly in a direction perpendicular to the optical axis, wherein the second carrier includes a first magnet interacting with the first yoke part and a second magnet interacting with the second yoke part, and a plurality of balls disposed between the first carrier and the second carrier. The first carrier may include a plurality of guide grooves to accommodate the plurality of balls, respectively. The plurality of balls may each be in contact with an upper end of the first carrier and a lower end of the second carrier, and may be movable within each of the plurality of guide grooves. Various other embodiments identified through the specification are possible.

14 Claims, 14 Drawing Sheets

(51) Int. Cl.

| | |
|---|---|
| ***H04N 5/232*** | (2006.01) |
| ***H04N 23/54*** | (2023.01) |
| ***H04N 23/57*** | (2023.01) |
| ***H04N 23/68*** | (2023.01) |

(58) Field of Classification Search

CPC .............. G02B 13/0065; G02B 27/646; H04N 5/2253; H04N 5/2254; H04N 5/2257; H04N 5/23287; H04N 23/682; H04N 23/685; H04N 23/687; G03B 2205/0007; G03B 2205/0053; G03B 2205/0069; G03B 3/02; G03B 3/10; G03B 5/00; G03B 5/04; G03B 13/36; G03B 30/00; H02K 11/21; H02K 11/33; H02K 41/0354; H02K 41/0356

USPC ....... 359/911, 554, 555, 557, 811, 813, 814, 359/824, 872, 877; 396/52, 55

See application file for complete search history.

(56) References Cited

U.S. PATENT DOCUMENTS

| | | | |
|---|---|---|---|
| 9,885,881 | B2 | 2/2018 | Kim et al. |
| 10,250,810 | B2 | 4/2019 | Miller et al. |
| 10,534,194 | B2 | 1/2020 | Lee |
| 2014/0362284 | A1 | 12/2014 | Shin et al. |
| 2015/0116514 | A1* | 4/2015 | Kim ..................... G02B 27/646 348/208.4 |
| 2015/0256727 | A1 | 9/2015 | Kim |
| 2016/0103297 | A1 | 4/2016 | Kobayashi |
| 2016/0252746 | A1 | 9/2016 | Kim et al. |
| 2017/0052388 | A1 | 2/2017 | Kim et al. |
| 2018/0069995 | A1 | 3/2018 | Lim |
| 2019/0196300 | A1 | 6/2019 | Kim |
| 2019/0212575 | A1 | 7/2019 | Oh |
| 2019/0294027 | A1 | 9/2019 | Kim et al. |
| 2021/0075897 | A1 | 3/2021 | Li et al. |

FOREIGN PATENT DOCUMENTS

| | | | |
|---|---|---|---|
| KR | 20150085426 | A | 7/2015 |
| KR | 20150104964 | A | 9/2015 |
| KR | 20150117236 | A | 10/2015 |
| KR | 10-1571037 | B1 | 11/2015 |
| KR | 10-1609351 | B1 | 4/2016 |
| KR | 10-1725442 | B1 | 4/2017 |
| KR | 10-1792441 | B1 | 10/2017 |
| KR | 20170141523 | A | 12/2017 |
| KR | 10-2020-0004490 | A | 1/2020 |
| KR | 10-2022-0030723 | A | 3/2022 |
| KR | 10-2457389 | B1 | 10/2022 |
| WO | 2014208195 | A1 | 12/2014 |
| WO | 2019184940 | A1 | 10/2019 |

OTHER PUBLICATIONS

International Search Report and Written Opinion of the International Searching Authority dated Apr. 14, 2022, in connection with International Application No. PCT/KR2021/019454, 9 pages.

Supplementary European Search Report dated Apr. 23, 2024, in connection with European Patent Application No. EP21911458.4, 7 pages.

Office Action dated Aug. 5, 2025, in connection with European Patent Application No. 21911458.4, 4 pages.

Office Action issued Mar. 31, 2026, in connection with China Patent Application No. 202180084546.8, 18 pages.

Office Action issued Jan. 23, 2026, in connection with Korean Patent Application No. 1020200179888, 13 pages.

Office Action issued Apr. 21, 2026, in connection with Indian Patent Application No. 202337037177, 6 pages.

Notice of Allowance issued Sep. 14, 2026, in connection with Chinese Patent Application No. 202180084546.8, 7 pages.

* cited by examiner

CAMERA MODULE AND ELECTRONIC DEVICE HAVING SAME

CROSS-REFERENCE TO RELATED APPLICATIONS

This application is a bypass continuation of International Application No. PCT/KR2021/019454, filed Dec. 21, 2021, which claims priority to Korean Patent Application No. 10-2020-0179888, filed Dec. 21, 2020, the disclosures of which are herein incorporated by reference in their entirety.

BACKGROUND

1. Field

Embodiments disclosed herein relate to an electronic device including a camera module, and more particularly, to an electronic device including a focus control function and/or image stabilization function of a camera.

2. Description of Related Art

In recent years, high-function ultra-small camera modules are being installed in mobile phones such as smartphones and portable terminals such as tablet PCs and notebook computers. As the size of the portable terminal becomes smaller, the image quality may be deteriorated due to the increasing response hands shaking during image capturing. For example, the higher the magnification, the greater the degree of image shake according to camera shake.

Therefore, in camera functions, a shake correction function is an essential and important function for obtaining a clear photograph. In general, as shake correction methods for an image stabilization function, there are optical image stabilization (OIS) and digital image stabilization (DIS). The optical image stabilization method (e.g., OIS) is a method to reduce shake by moving a lens or a sensor, and the digital image shake correction method (e.g., DIS) refers to a method to reduce shake by digital processing, which is a method borrowed from a portable terminal.

SUMMARY

As high performance of camera modules mounted on portable terminals is required and the required functions are diversified, the sizes of the camera modules are gradually increasing. However, in recent years, for the portability and usability of electronic devices, it is required to reduce the thicknesses of portable terminals. Thus, a method of reducing the size of a camera module while maintaining the performance of the camera module is being discussed.

When performing OIS in a camera module, a mid-guide member that enables the camera module to be driven biaxially may be inserted in order to suppress the occurrence of crosstalk caused by the rotational nature of a lens. However, due to the insertion of the mid-guide member, a height of the camera module may increase, and a manufacturing cost of the camera module may increase.

Despite reducing the size of a camera module by omitting a mid-guide including an OIS ball guide and omitting the mid-guide via a proposed yoke, the electronic device according to various embodiments of the disclosure is capable of implementing the same OIS performance.

The technical problems to be addressed by embodiments disclosed herein are not limited to those described above, and other technical problems, which are not described above, may be clearly understood by a person ordinarily skilled in the related art to which this disclosure belongs.

An electronic device according to an embodiment disclosed herein may include a housing, a lens assembly disposed in the housing along an optical axis, a first carrier operatively connected to the lens assembly and configured to move the lens assembly within the housing in an optical axis direction, wherein the first carrier may include a first yoke part and a second yoke part. The electronic device may include a second carrier operatively connected to the lens assembly to move the lens assembly within the housing in a direction perpendicular to the optical axis, wherein the second carrier may include a first magnet configured to interact with the first yoke part and a second magnet configured to interact with the second yoke part. The electronic device may include a plurality of balls disposed between the first carrier and the second carrier. The first carrier may include a plurality of guide grooves configured to accommodate the plurality of balls, respectively, and the plurality of balls may each be in contact with an upper end of the first carrier and a lower end of the second carrier, and each of the plurality of balls may be movable within a respective guide groove of the plurality of guide grooves.

A camera module according to an embodiment disclosed herein may include a housing, a lens assembly disposed in the housing along an optical axis, a first carrier including a first yoke part and a second yoke part, a second carrier configured to accommodate the lens assembly and including a first magnet configured to interact with the first yoke part and a second magnet configured to interact with the second yoke part, and a plurality of balls disposed between the first carrier and the second carrier. Here, the second carrier, the plurality of balls, and the first carrier may be stacked in order in an optical axis direction. The first carrier may include a plurality of guide grooves in which the plurality of balls are accommodated, respectively, and the plurality of balls may be movable within the plurality of guide grooves, respectively.

Advantageous Effects of Invention

According to various embodiments disclosed herein, it is possible to reduce the size of the camera module by omitting a mid-guide including a ball guide for OIS.

In addition, according to various embodiments, by omitting the mid-guide, it is possible to lower the manufacturing cost of the camera module.

Furthermore, by increasing the initial torque generated when performing OIS using the shape of the yokes according to various embodiments, it is possible to stably perform OIS even though the mid-guide is omitted.

In addition, various effects directly or indirectly identified through this document may be provided.

Before undertaking the detailed description below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

Definitions for certain words and phrases are provided throughout this patent document, those of ordinary skill in the art should understand that in many, if not most instances, such definitions apply to prior, as well as future uses of such defined words and phrases.

DETAILED DESCRIPTION

Hereinafter, various embodiments of the disclosure will be described with reference to the accompanying drawings. However, it shall be understood that it is not intended to limit the disclosure to specific embodiments, and that the disclosure includes various modifications, equivalents, and/or alternatives of the embodiments of the disclosure.

Figure 1:
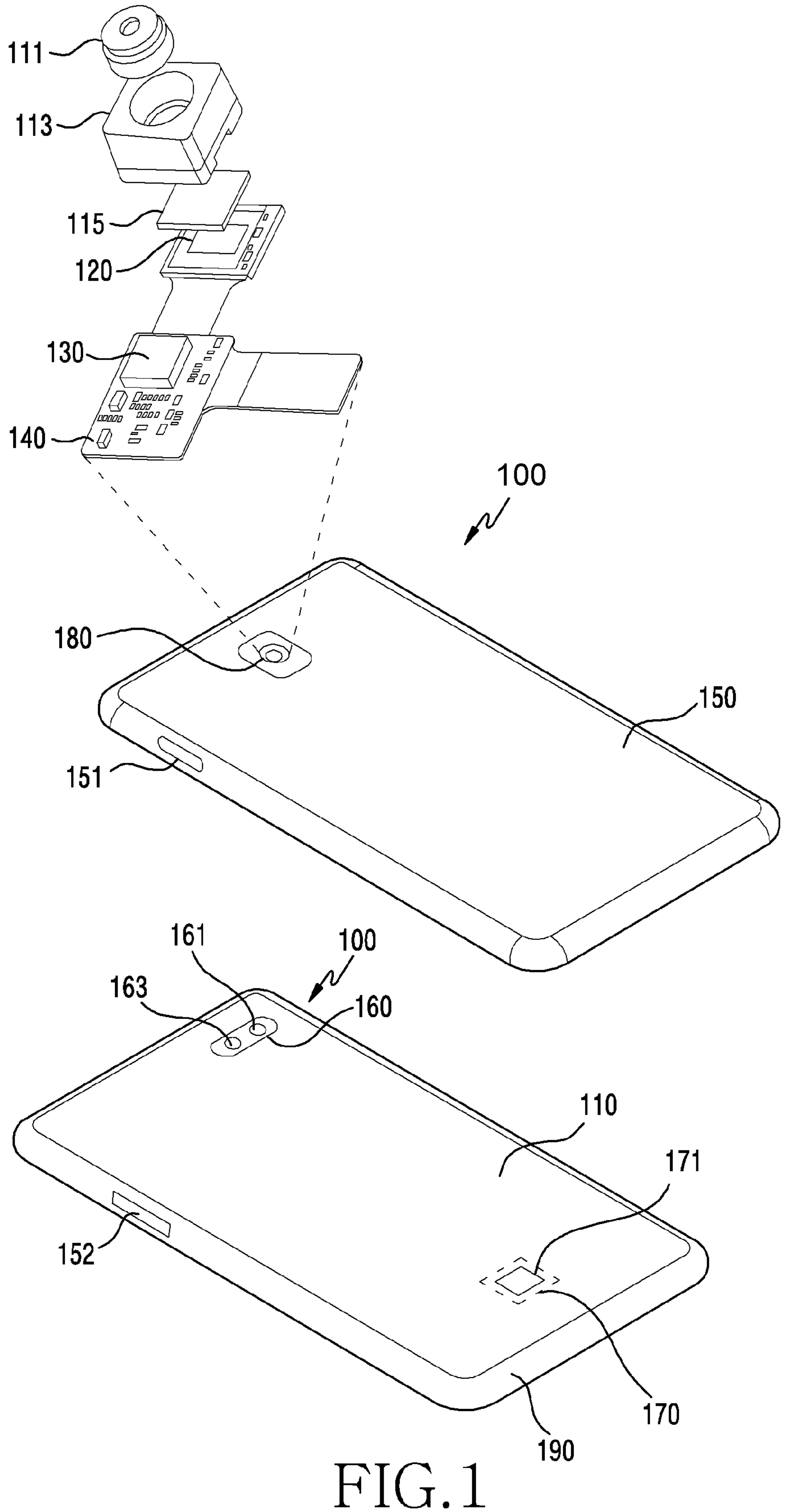
FIG. 1 is a view illustrating a structure of an electronic device and a camera module according to an embodiment.

FIG. 1 is a view illustrating a structure of an electronic device and a camera module according to an embodiment.

FIG. 1 is a view schematically illustrating an appearance of an electronic device 100 (e.g., the electronic device 1301 in FIG. 13) mounted with a camera module 180 (e.g., the camera module 1380 in FIG. 13) according to an embodiment, and the camera module 180. Although the embodiment of FIG. 1 is illustrated and described with reference to a mobile device, for example, a smartphone, it will be clearly understood by a person ordinarily skilled in the art that the embodiment is applicable to an electronic device equipped with a camera among various electronic devices or mobile devices.

Referring to FIG. 1, a display 110 may be disposed on the front surface of the electronic device 100 according to an embodiment. In an embodiment, the display 110 may occupy most of the front surface of the electronic device 100. The display 110 and a bezel 190 area surrounding at least some edges of the display 110 may be disposed on the front surface of the electronic device 100. The display 110 may include a flat area and a curved area extending from the flat area toward the side surface of the electronic device 100. The electronic device 100 illustrated in FIG. 1 is an example, and various embodiments are possible. For example, the display 110 of the electronic device 100 may include a flat area without a curved area, or may include a curved area at one edge rather than opposite edges. In an embodiment, the curved area may extend toward the rear surface of the electronic device so that the electronic device 100 may include an additional flat area.

In an embodiment, the electronic device 100 may additionally include a speaker, a receiver, a front camera, a proximity sensor, a home key, or the like. The electronic device 100 according to an embodiment may be provided with a rear cover 150, which is integrated with the main body of the electronic device. In another embodiment, the rear cover 150 may have a form that is separable from the main body of the electronic device 100 so as to allow a battery to be replaced. The rear cover 150 may be referred to as a battery cover or a back cover.

In an embodiment, a fingerprint sensor 171 for recognizing a user's fingerprint may be included in an area 170 of the display 110. The fingerprint sensor 171 may be disposed on a layer under the display 110 such that the fingerprint sensor 171 is not visually recognized by the user or is difficult to visually recognize. In addition, a sensor for additional user/biometric authentication in addition to the fingerprint sensor 171 may be disposed in a partial area of the display 110. In another embodiment, a sensor for user/biometric authentication may be disposed in an area of the bezel 190. For example, an IR sensor for iris authentication may be exposed through one area of the display 110 or through one area of the bezel 190.

In an embodiment, the front camera 161 may be disposed in an area 160 of the front surface of the electronic device 100. In the embodiment of FIG. 1, the front camera 161 is illustrated as being exposed through one area of the display 110, but in another embodiment, the front camera 161 may be exposed through the bezel 190. In an embodiment (not illustrated), the display 110 may include, on the rear surface of the area 160, at least one of an audio module (e.g., an audio module 1370 in FIG. 13, a sensor module (e.g., the sensor module 1376 in FIG. 13, or a sensor 163), a camera module (e.g., the camera module 1380 of FIG. 13 or the front camera 161), and a light-emitting element (not illustrated). For example, a camera module may be disposed on the front surface and/or the side surface of the electronic device 100 to face the front side and/or the lateral side of the electronic device 100. For example, the front camera 161 may not be visually exposed to the one area 160 and may include a hidden under display camera (UDC).

In an embodiment, the electronic device 100 may include one or more front cameras 161. For example, the electronic device 100 may include two front cameras such as a first front camera and a second front camera. In an embodiment, the first front camera and the second front camera may be cameras of the same type having the same specifications (e.g., pixels), but the first front camera and the second front camera may be implemented as cameras having different specifications. The electronic device 100 may support a function related to a dual camera (e.g., 3D imaging, auto focusing, or the like) through the two front cameras. The description of the above-mentioned front cameras may be equally or similarly applied to a rear camera of the electronic device 100.

In an embodiment, various kinds of hardware or sensors 163 to assist photographing, such as a flash, may be additionally disposed in the electronic device 100. For example, a distance sensor (e.g., a TOF sensor) for detecting the distance between a subject and the electronic device 100 may be further included. The distance sensor may be applied to both a front camera and/or a rear camera. The distance sensor may be separately disposed, or may be included and disposed on the front camera and/or the rear camera.

In an embodiment, at least one physical key may be disposed on a side portion of the electronic device 100. For example, a first function key 151 for turning on/off the display 110 or turning on/off the power of the electronic device 100 may be disposed on the right edge with reference to the front surface of the electronic device 100. In an embodiment, a second function key 152 for controlling the volume, screen brightness, or the like of the electronic device 100 may be disposed on the left edge with reference to the front surface of the electronic device 100. Furthermore, an additional button or key may also be disposed on the front surface or the rear surface of the electronic device 100. For example, a physical button or a touch button to which a specific function is mapped may be disposed on a lower area of the front bezel 190.

The electronic device 100 illustrated in FIG. 1 corresponds to one example and does not limit the shape of the device to which the technical idea disclosed in the disclosure is applied. For example, the technical idea of the disclosure is applicable to a foldable electronic device that is foldable in a horizontal or vertical direction by adopting a flexible display and a hinge structure, a rollable electronic device that can be rolled, or a tablet or a notebook computer. In addition, the present technical idea is applicable even when the first camera and the second camera oriented in the same direction may be disposed to be oriented in different directions through rotation, folding, deformation, or the like of the device.

Referring to FIG. 1, the electronic device 100 according to an embodiment may include a camera module 180. The camera module (e.g., the camera module 1380 in FIG. 13) 180 may include a lens assembly 111, a housing 113, an infrared cut filter 115, an image sensor 120, and an image signal processor 130.

In an embodiment, the lens assembly 111 may have different numbers, arrangements, and types of lenses depending on the front camera and the rear camera. Depending on the type of lens assembly, the front camera and the rear camera may have different characteristics (e.g., a focal length, a maximum magnification, or the like). The lens may move forward and rearward along the optical axis (not illustrated), and may operate to change a focal length so that a target object, which is a subject, can be clearly captured.

In an embodiment, the camera module 180 may include a barrel for mounting one or more lenses aligned on the optical axis and a housing 113 for mounting one or more coils and/or magnets surrounding the periphery of the barrel about the optical axis. In an embodiment, the camera module 180 may perform a function of stabilizing an image (e.g., OIS) acquired by an image sensor 120 using the one or more coils and/or magnets included in the housing 113. For example, the one or more coils may electromagnetically interact with each other under the control of a control circuit (e.g., the image signal processor 130 in FIG. 1 or the processor 1320 in FIG. 13). For example, the camera module 180 may control an electromagnetic force by controlling the direction and/or intensity of the current passing through the one or more coils under the control of the processor, and may move (rotate) the lens assembly 111 and at least a part of a carrier (e.g., the OIS carrier 230 in FIG. 2) including the lens assembly 111 in a direction substantially perpendicular to the optical axis (not illustrated) using Lorentz force caused by the electromagnetic force.

In an embodiment, the camera module 180 may compositely use different methods for image stabilization function. For example, an image stabilization function may be performed using optical image stabilization (e.g., OIS) and digital image stabilization (e.g., video digital image stabilization (VDIS) or DIS). In an embodiment, the camera module 180 may use digital image stabilization (VDIS or DIS) or electronic image stabilization (EIS). For example, the camera module 180 may perform image stabilization correction by performing a software process on a data output value of the image sensor 120. For example, the camera module 180 may extract a motion vector based on a difference between frames of an image through VDIS (or DIS), which is digital image stabilization, and may increase sharpness through image processing. In addition, the camera module 180 may extract a motion vector based on an image through VDIS (or DIS), and may recognize not only the shaking of the electronic device 100, but also the motion of a subject itself as shake. For example, the camera module 180 may extract the amount of shake using a gyro sensor through EIS, which is electronic image stabilization, and subsequent image stabilization may be performed in the same manner as in the VDIS.

In an embodiment, the infrared cut filter 115 may be disposed on the top surface of the image sensor 120. An image of the subject passing through the lenses may be partially filtered by the infrared cut filter 115 and then detected by the image sensor 120.

In an embodiment, the image sensor 120 may be disposed on the top surface of a printed circuit board 140 (e.g., a printed circuit board (PCB), a printed board assembly (PBA), a flexible PCB (FPCB), or a rigid-flex PCB (RFPCB). The image sensor 120 may be electrically connected to the image signal processor 130 connected to the printed circuit board 140 by a connector. A flexible printed circuit board (FPCB), a cable, or the like may be used as the connector.

In an embodiment, the image sensor 120 may be a complementary metal oxide semiconductor (CMOS) sensor or a charged coupled device (CCD) sensor. A plurality of individual pixels are integrated in the image sensor 120, and each individual pixel may include a micro lens, a color filter, and a photodiode. Each individual pixel is a kind of an optical detector that is capable of converting input light into an electrical signal. In general, an optical detector is not capable of detecting the wavelength of captured light by itself and is not capable of determining color information. The optical detector may include a photodiode.

In an embodiment, the light information of a subject that is incident through the lens assembly 111 may be converted into an electrical signal by the image sensor 120 and may be input to the image signal processor 130.

In an embodiment, when the image signal processor 130 and the image sensor 120 are physically separated, a sensor interface corresponding to the standards of the image signal processor 130 and the image sensor 120 may electrically connect the image sensor 120 and the image signal processor 130 to each other.

In an embodiment, the camera module 180 may be disposed on the front surface as well as the rear surface of the electronic device 100. In addition, the electronic device 100 may include multiple camera modules 180, as well as a single camera module 180 in order to improve camera performance. For example, the electronic device 100 may further include a front camera 161 for a video call or selfie photographing. The front camera 161 may support a relatively low number of pixels compared to the rear camera module. The front camera may be relatively smaller than the rear camera module.

Figure 2:
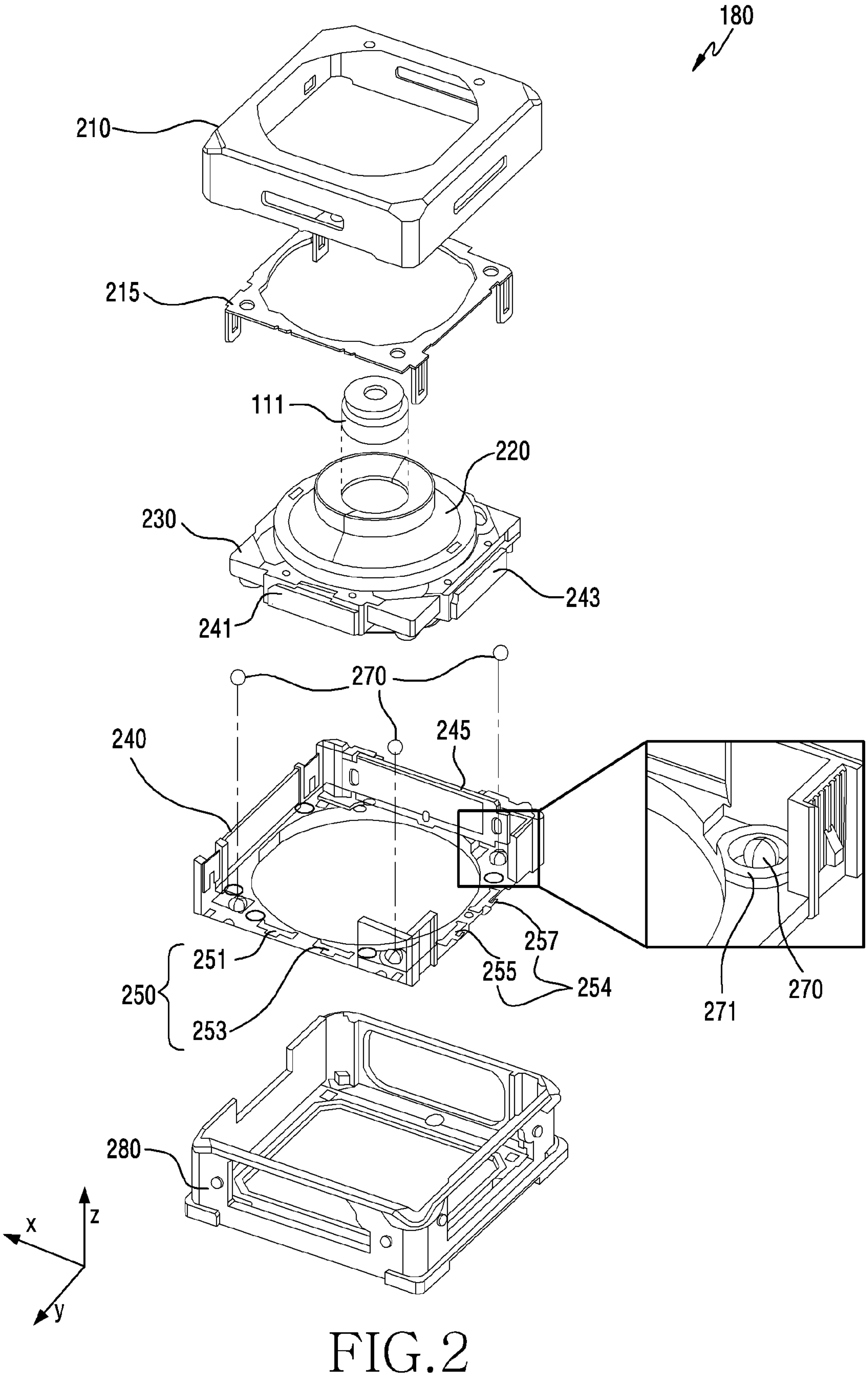
FIG. 2 is an exploded perspective view of a camera module according to an embodiment.
Figure 3:
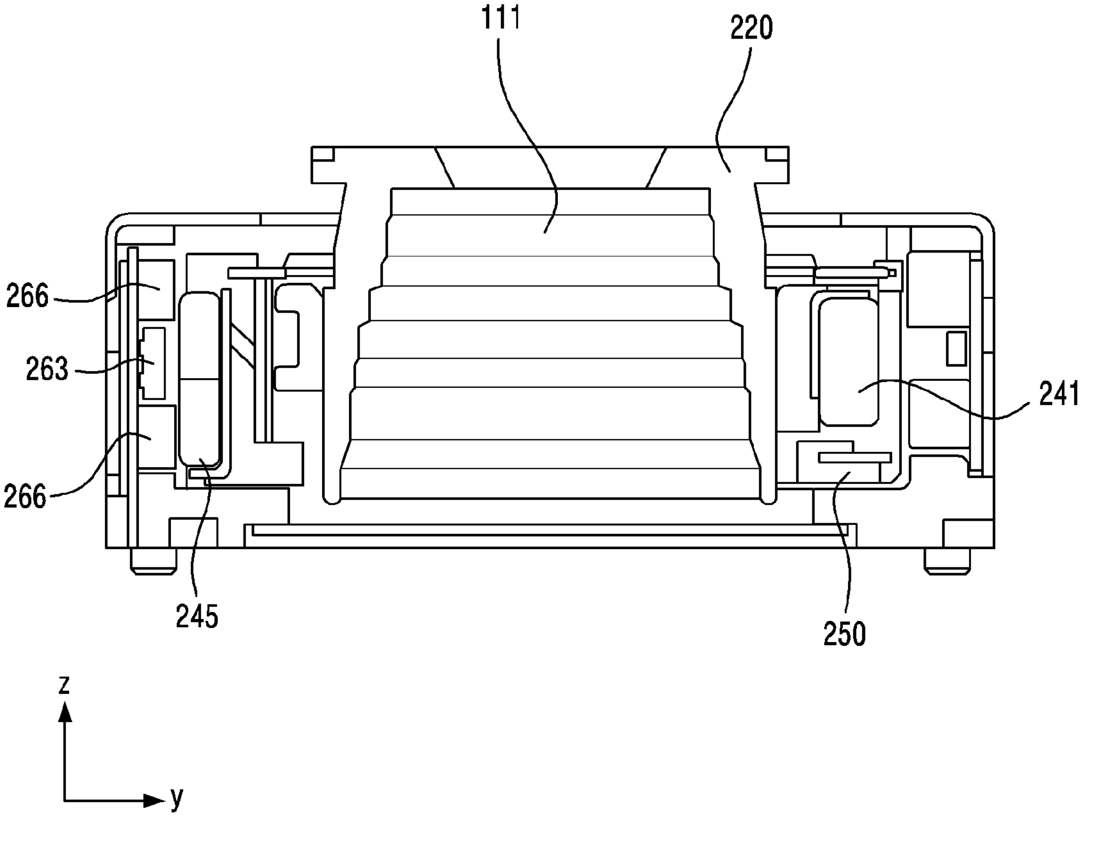
FIG. 3 is a cross-sectional view of the camera module according to an embodiment.
Figure 4:
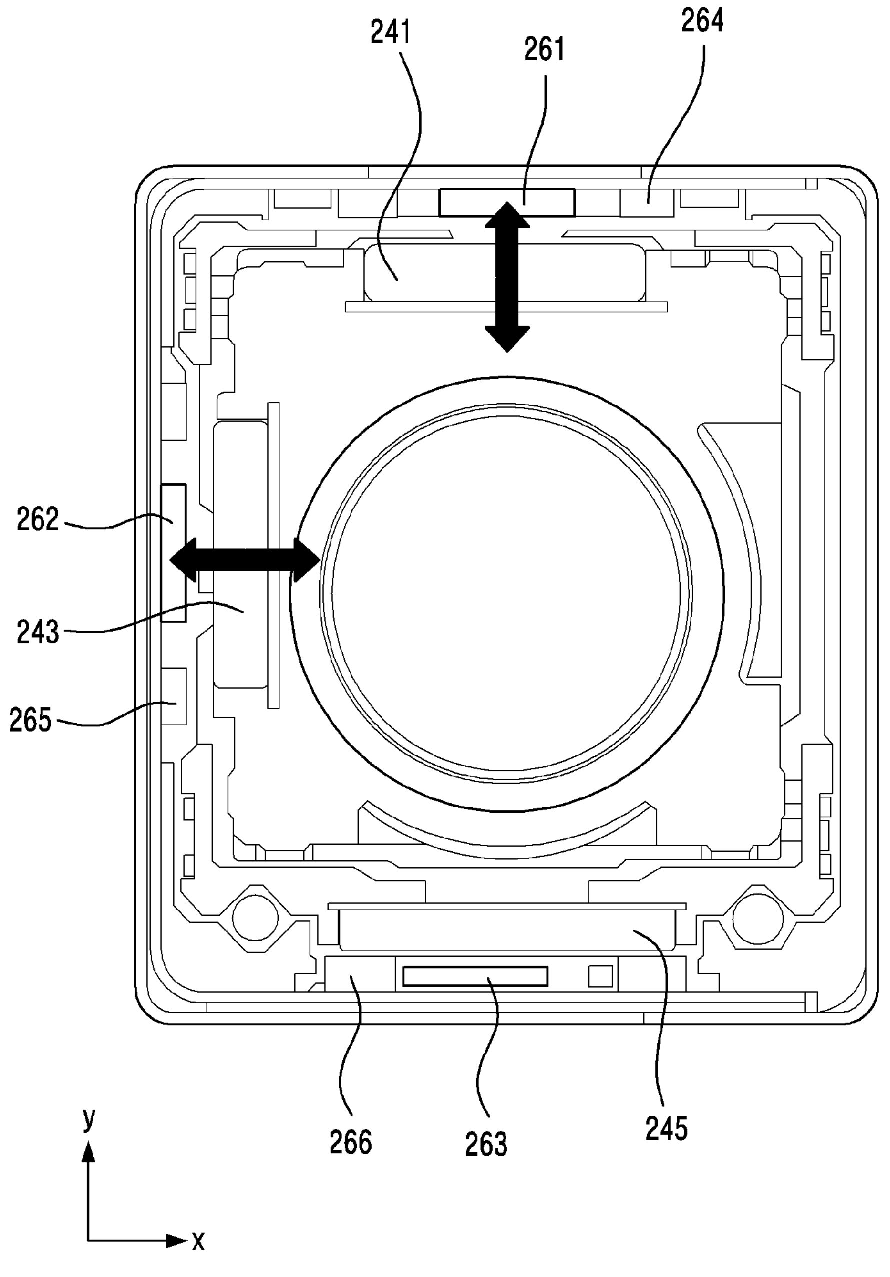
FIG. 4 is a plan view of the camera module according to an embodiment.

FIG. 2 is an exploded perspective view of a camera module 180 according to an embodiment. FIG. 3 is a cross-sectional view of the camera module 180 according to an embodiment. FIG. 4 is a plan view of the camera module 180 according to an embodiment. In the description of FIGS. 2 to 4, the configuration illustrated in FIG. 1 may be briefly described or a description thereof may be omitted.

Referring to FIGS. 2 to 4, in an embodiment, the camera module 180 may include a first housing 210, a second housing 280, a stopper 215, a lens assembly 111, a lens barrel 220, an OIS carrier 230, and an auto focus (AF) carrier 240. The first housing 210 may be referred to as or called a shield can. The second housing 280 may be referred to as or called a base.

In an embodiment, the first housing 210 may be shaped in the form of a metal box including an inner space to surround the exterior of the second housing 280. The first housing 210 may include an opening in the upper central portion of the first housing 210 such that a portion of the lens assembly 111 can be exposed. In an embodiment, the first housing 210 may be coupled to the second housing 280. The first housing 210 may be coupled to the second housing 280 to protect the stopper 215, the lens assembly 111, the lens barrel 220, the OIS carrier 230, and the AF carrier 240, which are accommodated in the second housing 280. The first housing 210 may be a shield can. The first housing 210 may serve as a shield as a shield can.

In an embodiment, the stopper 215 may limit the movement range of the lens assembly 111 and/or the lens barrel 220. The stopper 215 may limit the movement of the lens assembly 111 and/or the lens barrel 220, which move in the optical axis direction (e.g., the +z/−z direction) according to AF driving, in the optical axis direction. The stopper 215 may be disposed on the upper end of the OIS carrier 230 and/or the AF carrier 240. The stopper 215 may include at least one connecting member. The stopper 215 may be coupled to at least one surface of the AF carrier 240 via a coupling member such as a screw, and may limit, in the optical axis direction, the movement of the lens assembly 111 and/or the lens barrel 220 disposed in the inner space of the AF carrier 240.

In an embodiment, the lens barrel 220 may include a plurality of lenses aligned in the optical axis direction (e.g., the +z/−z axis direction) and a lens assembly 111 accommodating the plurality of lenses. Light may travel from the front (e.g., the +z direction) to the rear (e.g., the −z direction) of the lens assembly 111. The light incident from the front side of the lens assembly 111 to the frontmost lens of the lens assembly 111 may travel to the rear side of the lens assembly 111 through the plurality of lenses.

In an embodiment, the lens barrel 220 may be accommodated in the OIS carrier 230. The lens barrel 220 may be coupled to at least an inner surface of the OIS carrier 230. The lens barrel 220 and the lens assembly 111 included in the lens barrel 220 may be coupled to the OIS carrier 230 to move integrally with the OIS carrier 230. In an embodiment, the lens barrel 220 and the OIS carrier 230 may be integrated with each other.

In an embodiment, the OIS carrier 230 may be installed to be movable in the second housing 280. The OIS carrier 230 is movable in two dimensions (e.g., in two axis directions). The electronic device 100 may drive the OIS carrier 230 to implement a hand shake correction function (e.g., an image stabilization function). In other words, the electronic device 100 may move the OIS carrier 230 to prevent image quality from being deteriorated due to shaking. For example, the electronic device 100 may correct camera shake by moving the OIS carrier 230 in a direction substantially perpendicular to the optical axis direction (e.g., the −x/−x direction or the +y/−y direction).

In an embodiment, the AF carrier 240 may be installed to be movable within the second housing 280. The AF carrier 240 may be movable in one dimension (e.g., in one axial direction). The electronic device 100 may drive the AF carrier 240 to implement a focus control function. In other words, the electronic device 100 may move the AF carrier 240 to prevent image quality from being deteriorated due to defocus. For example, the electronic device 100 may adjust the focal length of the camera by moving the AF carrier 240 in the optical axis direction (e.g., the +z/−z direction).

In an embodiment, each of the first magnet 241 and the second magnet 243 may be attached to at least a portion of the OIS carrier 230. Each of the first magnet 241 and the second magnet 243 may be disposed on at least a portion of a side surface of the OIS carrier 230. For example, the first magnet 241 may be disposed on a first side surface of the OIS carrier 230 oriented in the first direction (e.g., the +y direction). The second magnet 243 may be disposed on a second side surface of the OIS carrier 230 oriented in the second direction (e.g., the −x direction). The first magnet 241 may move in a first axis direction (e.g., the +y/−y direction) by a magnetic force generated through interaction with the first coil 264. The second magnet 243 may move in the second axis direction (e.g., the +x/−x direction) by a magnetic force generated through interaction with the second coil 265.

In an embodiment, at least one printed circuit board may be electrically connected to at least a portion of the OIS carrier 230 and at least a portion of the AF carrier 240. When the electronic device 100 shakes, at least one processor (e.g., the processor 1320 in FIG. 13) included in the electronic device 100 may generate an OIS control value to compensate for the shaking of the electronic device 100, and the electronic device 100 may implement OIS by transmitting an electrical signal corresponding to the OIS control value to an OIS driving coil (e.g., the first coil 264 and/or the second coil 265) disposed on the OIS carrier 230. At the time of capturing a photo by the camera, at least one processor (e.g., the processor 1320 in FIG. 13) included in the electronic device 100 may generate an AF control value to adjust a focal length between the subject and the camera, and the electronic device 100 may implement AF by transmitting an electric signal corresponding to the AF control value to the AF driving coil (e.g., the third coil 266) disposed on the AF carrier 240.

The magnets (e.g., the first magnet 241, the second magnet 243, or the third magnet 245) and coils (e.g., the first coil 264, the second coil 265, or the third coil 266) of the camera module 180 according to an embodiment is not limited to the arrangement illustrated in the drawing. In various embodiments, the first coil 264 and the second coil 265 may be disposed to face each other or to be in a line. For example, any one of the first coil 264 and the second coil 265 may be driven in a solenoid type with a corresponding magnet, and the other may be driven in a Lorentz type. In this case, regardless of whether the first and second coils are disposed to face each other or to be in a line, it is possible to drive the lens assembly 111 or a carrier (e.g., the OIS carrier 230) including the lens assembly 111 in two directions substantially perpendicular to each other. In addition, the magnets (e.g., the first magnet 241, the second magnet 243, or the third magnet 245) of the camera module 180 may have various combinations of polarities.

In an embodiment, at least one Hall sensor may be disposed at the center of the at least one of the driving coils (e.g., the first coil 264, the second coil 265, and the third coil 266). For example, a first Hall sensor 261 may be disposed at the center of the first coil 264. A second Hall sensor 262 may be disposed at the center of the second coil 265. A third Hall sensor 263 may be disposed at the center of the third coil 265.

In an embodiment, the at least one Hall sensor (e.g., the first Hall sensor 261, the second Hall sensor 262, or the third Hall sensor 263) may detect the displacement of the at least one carrier based on the position of the magnet (e.g., the first magnet 241, the second magnet 243, or the third magnet 245) moving with at least one carrier (e.g., the OIS carrier 230 or the AF carrier 240). Through interaction with an opposing magnet facing, the at least one Hall sensor may measure a position of the opposing magnet relative to the Hall sensor. The at least one Hall sensor may detect the position of the opposing magnet by measuring a change in a magnetic field formed by the opposing magnet. For example, the first Hall sensor 261 may be configured to measure the position of the first magnet 241 relative to the first Hall sensor 261 in the first axis (e.g., the y axis) direction by being disposed at the center of the first coil 264. The second Hall sensor 262 may be configured to measure the position of the second magnet 243 relative to the second Hall sensor 262 in the second axis (e.g., the x axis) direction by being disposed at the center of the second coil 265. The third Hall sensor 263 may be configured to measure the position of the third magnet 245 relative to the third Hall sensor 263 in the third axis (e.g., the z axis) direction by being disposed at the center of the third coil 266.

In an embodiment, two or more Hall sensors (e.g., the first Hall sensor 261 and the second Hall sensor 262) may be included inside two or more coils (e.g., the first coil 264 and the second coil 265), respectively. The Hall sensors included in the coils may be referred to as built-in Hall sensors. For example, the first Hall sensor 261 may be built in a driver integrated circuit (IC) located inside the first coil 264, and the second Hall sensor 262 may be built in a driver IC located inside the second coil 265. In an embodiment, in order to process crosstalk that occurs between the driving in the first axis (e.g., the y axis) and the driving in the second axis (e.g., the x axis) of the OIS carrier 230, the camera module 180 may include at least two Hall sensors (e.g., the first Hall sensor 261 and the second Hall sensor 262).

According to an embodiment, the camera module 180 may include another sensor configured to detect the movement (rotation) of at least one magnetic body (or magnet) (e.g., the first magnet 241, the second magnet 243, or the third magnet 245). For example, the camera module 180 may include a tunnel magneto-resistance sensor (TMR sensor), and may detect the movement (rotation) of at least one magnet using a resistance value that changes based on the relative angles of a plurality of magnets of the TMR sensor. According to another embodiment, the camera module 180 may detect the movement (rotation) of at least one magnet using an anisotropic magneto-resistance (AMR) sensor or a giant magneto-resistance (GMR) sensor.

In an embodiment, at least one ball 270 may be disposed in a gap between the OIS carrier 230 and the AF carrier 240. The at least one ball 270 may have a spherical shape having a first diameter. The at least one ball 270 may move or rotate in a plane direction (e.g., a plane direction including the x-axis and the y-axis) rather than moving in only one axis.

In an embodiment, the AF carrier 240 may include at least one guide groove 271 corresponding to the at least one ball 270. The AF carrier 240 may include a guide groove 271 capable of accommodating at least a portion of the at least one ball 270 in at least one area.

In an embodiment, the guide groove 271 may have a larger size than the at least one ball 270 such that the at least one ball 270 accommodated in the guide groove 271 can freely rotate or move. In an embodiment, the guide groove 271 may be implemented in a circular shape. In other words, the guide groove 271 may be implemented in a circular shape having a constant diameter, not in a shape extending (elongated) in one direction. In an embodiment, the guide groove 271 may be implemented in various shapes. For example, the guide groove 271 may be implemented in a cylindrical shape. The guide groove 271 may be implemented in a hemispherical shape. For example, the guide groove 271 may be implemented in a circular shape or a hemispherical shape having a second diameter greater than the first diameter.

The guide groove 271 may be called or referred to as a groove, a ball guide, or a ball guide groove.

In an embodiment, the at least one ball 270 may be disposed between the OIS carrier 230 and the AF carrier 240. The at least one ball 270 may be direct and/or physical contact with the OIS carrier 230 and the AF carrier 240. An intermediate member (e.g., a mid-guide) may not be included between the OIS carrier 230 and the AF carrier 240. In other words, without an intermediate member (e.g., a mid-guide) allowing a movement in the two-axis (e.g., the x-axis and y-axis) direction between the OIS carrier 230 and the AF carrier 240, at least one ball 270 allowing a movement at least in a plane direction (e.g., in the direction of a plane including the x axis and the y axis) may be included.

In an embodiment, the at least one ball 270 may include three balls. However, this is merely an example, and the at least one ball 270 may implement the same function even if the at least one ball is two balls or four balls.

In an embodiment, the AF carrier 240 may include a first yoke part 250 disposed to correspond to the first magnet 241, and a second yoke part 254 disposed to correspond to the second magnet 243. The first yoke part 250 may be disposed to at least partially overlap the first magnet 241 when viewed in the optical axis direction (e.g., from the +z direction to the −z direction). The second yoke part 254 may be disposed to at least partially overlap the second magnet 243 when viewed in the optical axis direction (e.g., from the +z direction to the −z direction).

In an embodiment, at least a portion of the first yoke part 250 and at least a portion of the second yoke part 254 may be formed of a conductive material. For example, at least a portion of the first yoke part 250 and at least a portion of the second yoke part 254 may be formed of a metal material. For example, the first yoke part 250 may be magnetized by the first magnet 241, and the second yoke part 254 may be magnetized by the second magnet 243. For example, a magnetic force (e.g., attractive force) may act between the first yoke part 250 and the first magnet 241, and a magnetic force (e.g., attractive force) may act between the second yoke part 254 and the second magnet 243.

In an embodiment, the first yoke part 250 and/or the second yoke part 254 may control the movement (e.g., a rotational motion) of the OIS carrier 230 due to the magnetic force (e.g., attractive force). By the magnetic force (e.g., attractive force), the OIS carrier 230 may be suppressed in rotational motion and may be restrained in the movement in a first axis direction (e.g., +y/−y direction) and a second axis direction (e.g., +x/−x direction).

In an embodiment, the camera module 180 may perform hand shake correction (e.g., image stabilization) through the OIS carrier 230. The camera module 180 may improve the accuracy of hand shake correction through the interaction that occurs between the OIS carrier 230 and the AF carrier 240. The first magnet 241 and the second magnet 243 attached to the OIS carrier 230 are located to face the first yoke part 250 and the second yoke part 254 attached to the AF carrier 240 so that a magnetic attractive force can be applied to each other. The camera module 180 may control unnecessary movement (e.g., movement or rotation) of the OIS carrier 230 by matching the center of the magnets with the center of the yokes using the attractive force between the magnets and the yokes. In an embodiment, in addition to the attractive force between the magnets and the yokes, unnecessary movement of the OIS carrier 230 may be controlled based on the distances between the magnets and the yokes and the shapes of the yokes.

In an embodiment, the first yoke part 250 may include a first yoke 251 and a second yoke 253. The first yoke 251 and the second yoke 253 may be disposed separately. The second yoke part 254 may include a third yoke 255 and a fourth yoke 257. The third yoke 255 and the fourth yoke 257 may be disposed separately.

In an embodiment, the first yoke part 250 and the second yoke part 254 may be implemented in a single structure, rather than in separate structures. In other words, the first yoke part 250 and the second yoke part 254 may not be divided into two or more yokes, and may be a single structure as in the embodiments illustrated in FIGS. 5 and 10.

Figure 5:
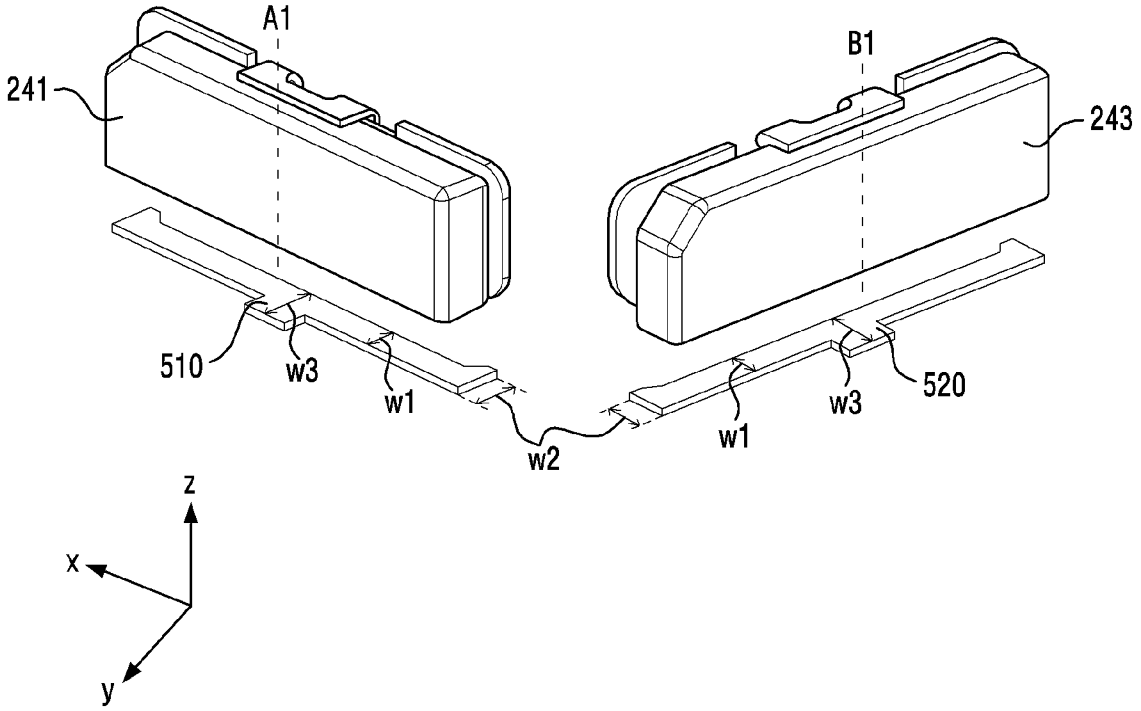
FIG. 5 illustrates a first shape of yokes in a camera module according to an embodiment.

The technical features described above may also be applied to a curved camera module 180 including a prism. For example, the electronic device 100 may include a camera module 180 including a periscope lens, and at least one magnet (e.g., a first magnet 241, a second magnet 243, or a third magnet 245) and/or at least one coil (e.g., a first coil 264, a second coil 265, or a third coil 266) may be disposed in a light moving direction. FIG. 5 illustrates a first shape of yokes in a camera module 180 according to an embodiment.

Referring to FIG. 5, the camera module 180 may include a first magnet 241 and a second magnet 243. The camera module 180 may include a first yoke part 510 disposed to correspond to the first magnet 241, and may include a second yoke part 520 disposed to correspond to the second magnet 243. The first yoke part 510 may have a shape symmetrical with reference to a first axis A1 that passes through the center of the first magnet 241 and is parallel to the optical axis. The second yoke part 520 may have a shape symmetrical with reference to a second axis B1 that passes through the center of the second magnet 243 and is parallel to the optical axis. In the disclosure, the shape symmetrical with reference to the first axis A1 may mean a symmetrical shape with reference to a plane including the first axis A1 and perpendicular to the longitudinal direction (the x-axis direction) of the first magnet 241. In the disclosure, the shape symmetrical with reference to the second axis B1 may mean a symmetrical shape with reference to a plane including the second axis B1 and perpendicular to the longitudinal direction (the y-axis direction) of the second magnet 243.

In an embodiment, the first yoke part 510 and the second yoke part 520 may have a bar shape. The first yoke part 510 and the second yoke part 520 may have a bar shape having a first width W1.

In an embodiment, in the first yoke part 510 and the second yoke part 520, in order to increase the rotation torque with respect to the lens assembly 111, the width of opposite ends of the first magnet 241 and the second width W2 of opposite ends of the second magnet 243 may be greater than the first width W1. For example, the opposite ends of the first yoke part 510 and the opposite ends of the second yoke part 520 may protrude to one side in the width direction (e.g., in the −y direction or +x direction). For example, the first yoke part 510 may protrude in the −y direction, and the second yoke part 520 may protrude in the +x direction. In addition, in an embodiment (not illustrated), the opposite ends of the first yoke part 510 and the opposite ends of the second yoke part 520 may protrude to opposite sides in the width direction (e.g., −y and +y directions, or +x and −x direction). For example, the first yoke part 510 may protrude in the first axis direction (e.g., the +y/−y direction), and the second yoke part 520 may protrude in the second axis direction (e.g., the +x/−x direction). In addition, in an embodiment (not illustrated), the opposite ends of the first yoke part 510 and the opposite ends of the second yoke part 520 may protrude in different directions. For example, one end of the first yoke part 510 may protrude in the −y direction, and the other end of the first yoke part 510 may protrude in the +y direction. One end of the second yoke part 520 may protrude in the +x direction, and the other end of the second yoke part 520 may protrude in the −x direction.

In an embodiment, a width of the central portion of the first magnet 241 and a third width W3 of the central portion of the second magnet 243 may be greater than the first width W1 in order to increase the attractive force that causes the magnets 241 and 243 and the yoke parts 510 and 520 to vertically pull each other. For example, the central portion of the first yoke part 510 may protrude to a side in the width direction (e.g., in the +y direction), and the central portion of the second yoke part 520 may protrude to a side in the width direction (e.g., in the −x direction). For example, the central portion of the first yoke part 510 may protrude to a side in the width direction (e.g., in the −y direction), and the central portion of the second yoke part 520 may protrude to a side in the width direction (e.g., in the +x direction). For example, the central portion of the first yoke part 510 may protrude to a side in the width direction (e.g., in the −y direction), and the central portion of the second yoke part 520 may protrude a side in the width direction (e.g., in the −x direction). For example, the central portion of the first yoke part 510 may protrude to a side in the width direction (e.g., in the +y direction), and the central portion of the second yoke part 520 may protrude to a side in the width direction (e.g., in the +x direction). For example, the central portion of the first yoke part 510 may protrude to opposite sides in the width direction (e.g., in the −y and +y directions), and the central portion of the second yoke part 520 may protrude to opposite sides in the width direction (e.g., in the −x and +x directions).

Figure 6:
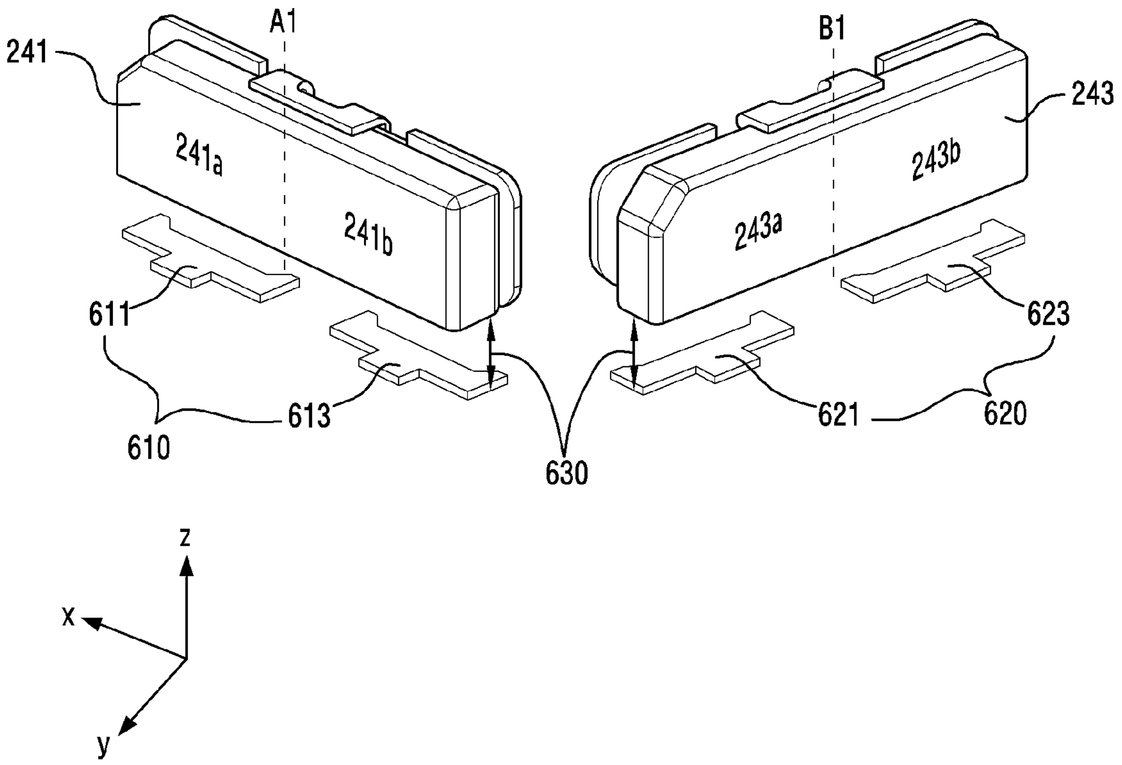
FIG. 6 illustrates a second shape of yokes in a camera module according to an embodiment.

FIG. 6 illustrates a second shape of yokes in a camera module 180 according to an embodiment.

Referring to FIG. 6, when a yoke part is configured with a plurality of divided yokes in the camera module 180, suppressing malfunctions, such as exceeding of the shake correction range by the OIS carrier 230 or excessive rotation of the lens assembly 111, minimizes a driving force and power consumption. For example, when the first yoke 611 magnetically interacts with a first area 241*a* of the first magnet 241 and the second yoke 613 magnetically interacts with a second area 241*b* of the first magnet 241, it is possible to suppress unnecessary rotation of the lens assembly 111.

In an embodiment, the first yoke part 610 may include two physically separated yokes. The first yoke part 610 may include a first yoke 611 and a second yoke 613. The second yoke part 620 may include two physically separated yokes. The second yoke part 620 may include a third yoke 621 and a fourth yoke 623.

In an embodiment, the first yoke part 610 may include a first yoke 611 and a second yoke 613 disposed to correspond to respective areas 241*a* and 241*b* divided with reference to a first axis A1 that passes through the center of the first magnet 241 and is parallel to the optical axis. In an embodiment, the respective areas 241*a* and 241*b* divided with reference to the first axis A1 may be understood as areas divided with reference to a plane that passes through the first axis A1 and is perpendicular to the longitudinal direction of the first magnet 241 (the x-axis direction). The second yoke part 620 may include a third yoke 621 and a fourth yoke 623 disposed to correspond to respective areas 243*a* and 243*b* divided with reference to a second axis B1 that passes through center of the second magnet 243 and is parallel to the optical axis. In an embodiment, the respective areas 243*a* and 243*b* divided with reference to the second axis B1 may be understood as areas divided with reference to a plane that passes through the second axis B1 and is perpendicular to the longitudinal direction of the second magnet 243 (the y-axis direction). In other words, the first yoke 611 and the second yoke 613 may be separately disposed to correspond to the respective areas 241*a* and 241*b* of the first magnet 241, and the third yoke 621 and the fourth yoke 623 may be separately disposed to correspond to the respective areas 243*a* and 243*b* of the second magnet 243.

In an embodiment, referring to FIG. 6, each of the yokes 611, 613, 621, and 623 may have a shape in which a central portion and opposite ends protrude, rather than a simple bar shape. For example, the central portion of the first yoke 611 and the central portion of the second yoke 613 may protrude in a first direction (e.g., the +y direction). The opposite ends of the first yoke 611 and the opposite ends of the second yoke 613 may protrude in a direction opposite to the first direction (e.g., in the −y direction). For example, the central portion of the third yoke 621 and the central portion of the fourth yoke 623 may protrude in a second direction (e.g., the −x direction). The opposite ends of the third yoke 621 and the opposite ends of the fourth yoke 623 may protrude in a direction opposite to the second direction (e.g., in the +x direction).

In an embodiment, elements (e.g., shape, pattern, or size) of respective yokes 611, 613, 621, and 623 illustrated in FIG. 6 may be the same as those of the yokes of the embodiment of FIG. 5. For example, the protrusion directions, symmetries, and/or widths of respective yokes 611, 613, 621, and 623 may be varied. For example, when viewed in the optical axis direction (e.g., from the +z direction to the −z direction), the first yoke 611 and the second yoke 613 may be formed in an asymmetric shape with reference to the first axis A1. In addition, when viewed in the optical axis direction (e.g., from the +z direction to the −z direction), the third yoke 621 and the fourth yoke 623 may be formed in an asymmetric shape with reference to the second axis B1.

In an embodiment, the distance between the first to fourth yokes 611 to 623 and the corresponding magnets 241 and 243 may be a first interval 630.

Figure 7:
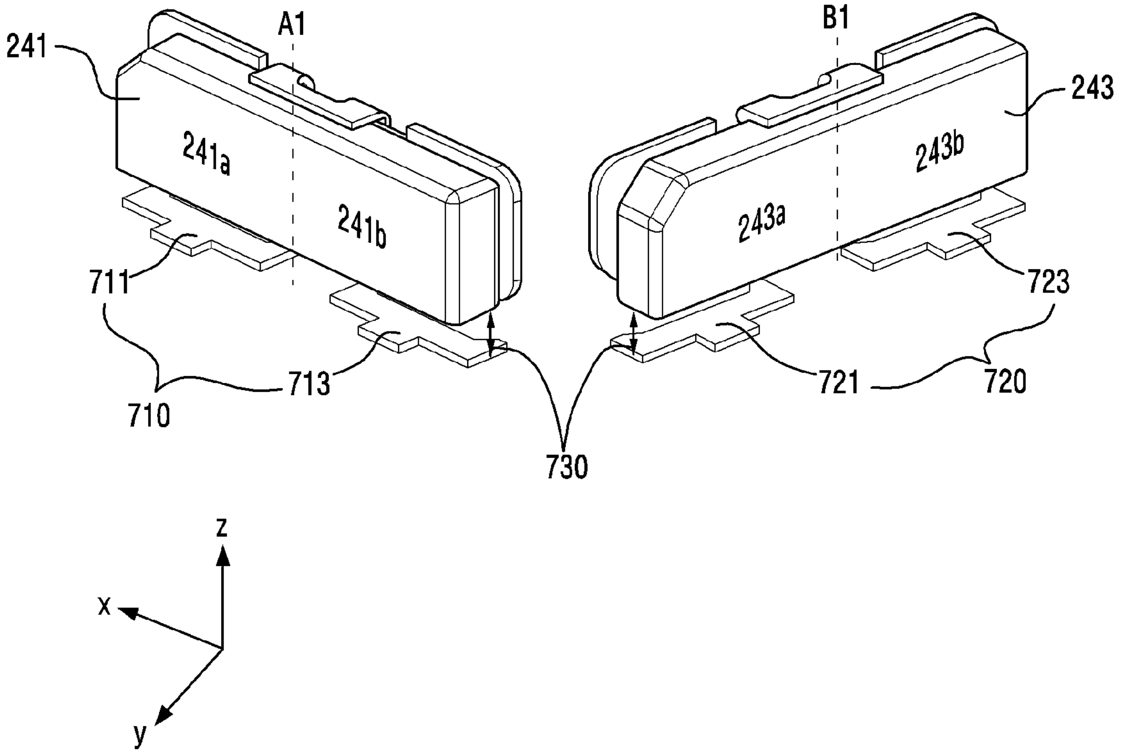
FIG. 7 illustrates a third shape of yokes in a camera module according to an embodiment.

FIG. 7 illustrates a third shape of yokes in a camera module 180 according to an embodiment. The embodiment of FIG. 7 may be the same as the embodiment of FIG. 6 in terms of the elements of yokes, such as the shape, pattern, and size. For example, the description of the first yoke 611 to the fourth yoke 623 of FIG. 6 may be equally or similarly applicable to the first yoke 711 and the second yoke 713 of the first yoke part 710 and the third yoke 721 and the fourth yoke 723 of the second yoke part 720 of FIG. 7. Since the equally or similarly applied portions (e.g., the areas 241*a* and 241*b* divided with reference to the first axis A1, and the areas 243*a* and 243*b* divided with reference to the second axis B1) have been described with reference to FIG. 6, the description of the portions may be omitted in the description made with reference to FIG. 7. However, in the embodiment illustrated in FIG. 7, the distance between the magnets 241 and 243 and the yoke parts 710 and 720 may be a second interval 730 smaller than the first interval 630 compared to the embodiment illustrated in FIG. 6. In an embodiment, as illustrated in FIG. 7, the smaller the distance between the magnets 241 and 243 and the yoke parts 710 and 720, the stronger the magnetic force (e.g., attractive force) is generated. Thus, the OIS carrier 230 and the AF carrier 240 can be strongly attached to each other.

Figure 8:
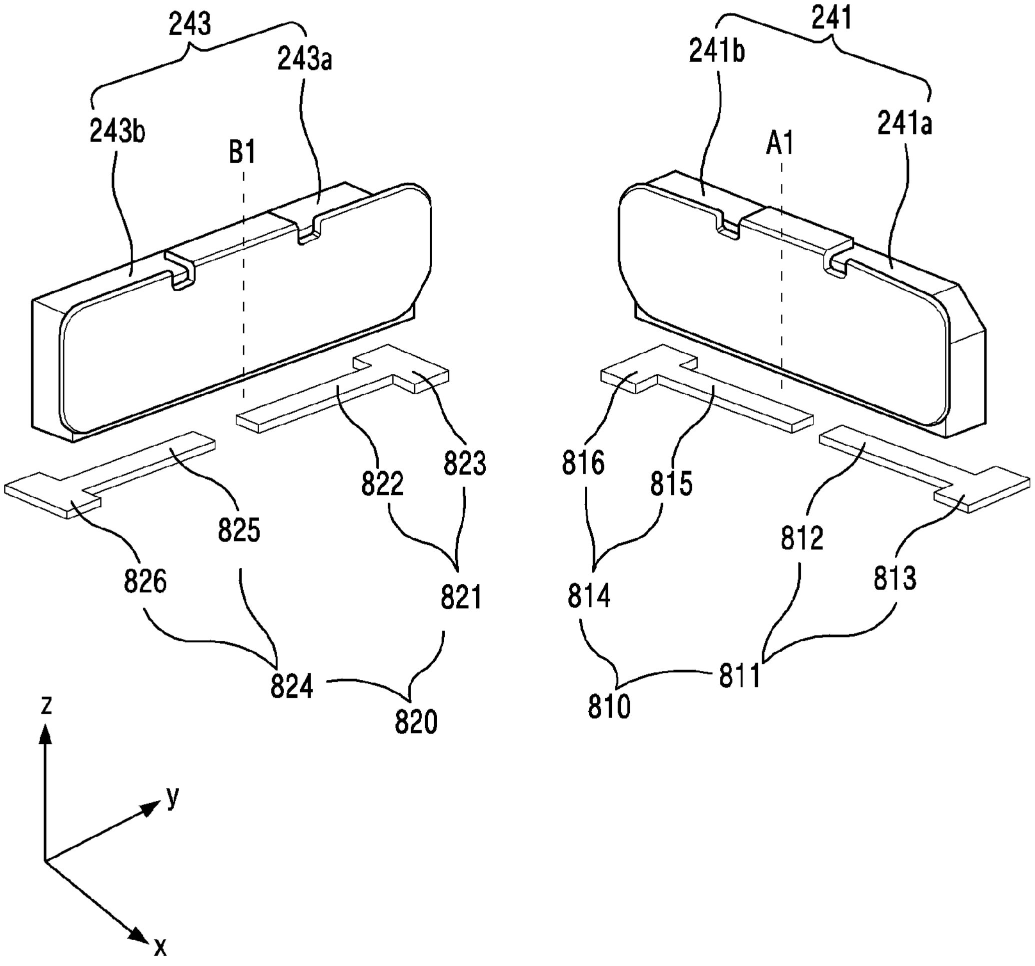
FIG. 8 illustrates a fourth shape of yokes in a camera module according to an embodiment.

FIG. 8 illustrates a fourth shape of yokes in a camera module 180 according to an embodiment.

Referring to FIG. 8, the first yoke part 810 may include a first yoke 811 and a second yoke 814 disposed to correspond to respective areas 241*a* and 241*b* divided with reference to a first axis A1 that passes through the center of the first magnet 241 and is parallel to the optical axis. The second yoke part 820 may include a third yoke 821 and a fourth yoke 824 disposed to correspond to respective areas 243*a* and 243*b* divided with reference to a second axis B1 that passes through center of the second magnet 243 and is parallel to the optical axis. In other words, the first yoke 811 and the second yoke 814 may be separately disposed to correspond to the respective areas 241*a* and 241*b* of the first magnet 241, and the third yoke 821 and the fourth yoke 824 may be separately disposed to correspond to the respective areas 243*a* and 243*b* of the second magnet 243.

In an embodiment, referring to FIG. 8, an end for each of the first to fourth yokes 811 to 824 may protrude. For example, the first to fourth yokes 811 to 824 may have a T-shape, rather than a simple bar shape. The first yoke 811 may include a wide portion 813 corresponding to one end of the first magnet 241 and a narrow portion 812 corresponding to a portion other than the end of the first magnet 241. The second yoke 814 may include a wide portion 816 corresponding to another end of the first magnet 241 and a narrow portion 815 corresponding to a portion other than the other end of the first magnet 241. Descriptions of the first yoke 811 and the second yoke 814 may be equally or similarly applicable to the third yoke 821 (e.g., a wide portion 823 and a narrow portion 822) and a fourth yoke 824 (e.g., a wide portion 826 and a narrow portion 825).

In an embodiment, the first yoke 811 and the second yoke 814 may be symmetrical to each other with reference to a first axis A1 that passes through the center of the first magnet 241 and is parallel to the optical axis. The third yoke 821 and the fourth yoke 824 may be symmetrical to each other with reference to a second axis B1 that passes through the center of the second magnet 243 and is parallel to the optical axis.

In an embodiment, referring to FIG. 8, by widening the yoke portions corresponding to the opposite ends of the first magnet 241 and the opposite ends of the second magnet 243, it is possible to suppress rotation of the lens assembly 111. In other words, when the lens assembly 111 rotates in an undesired direction while the camera module 180 performs the OIS function, the first yoke part 810 and the second yoke part 820 may rotate the lens assembly 111 to the original position based on the mutual magnetic forces between the yoke parts 813, 816, 823, and 826 corresponding to the opposite ends of the magnets 241 and 243 and the magnets 241 and 243 through a restoring torque.

Figure 9:
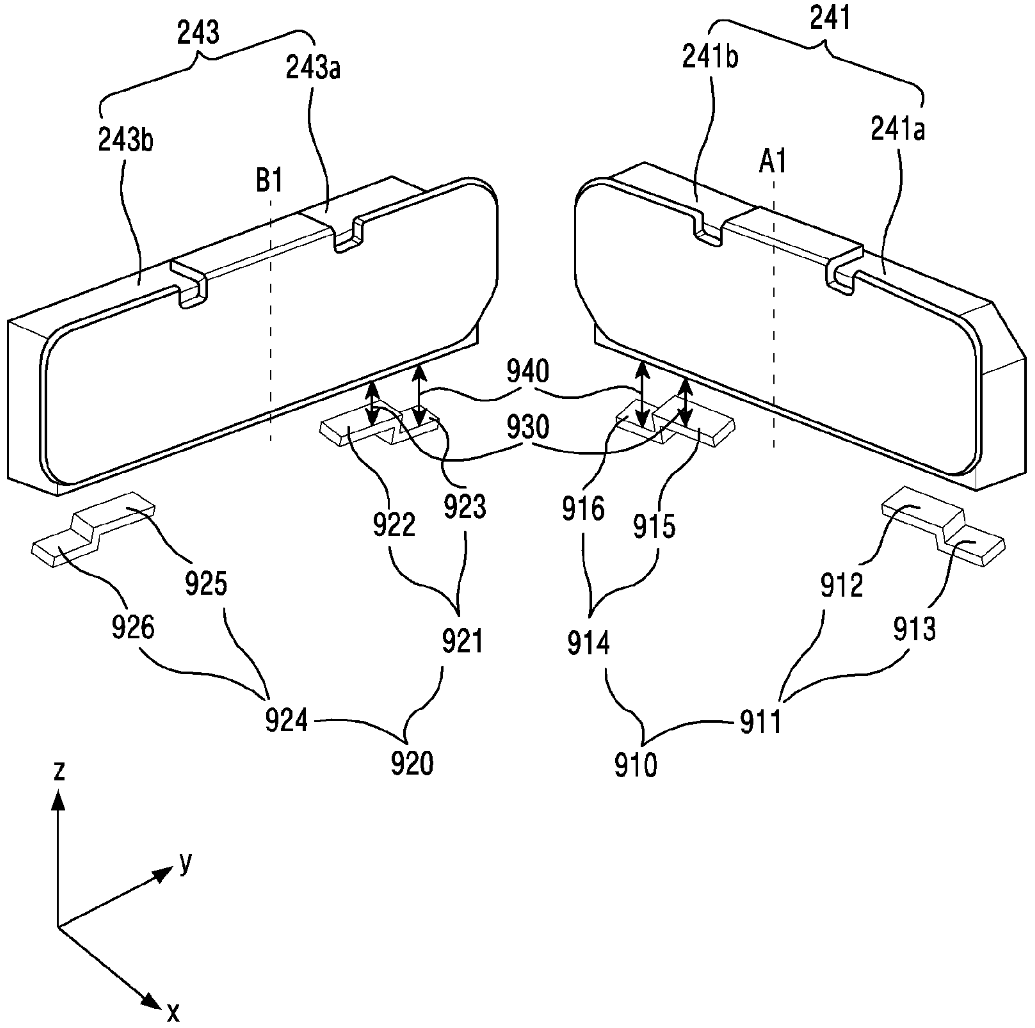
FIG. 9 illustrates a fifth shape of yokes in a camera module according to an embodiment.

FIG. 9 illustrates a fifth shape of yokes in a camera module 180 according to an embodiment.

Referring to FIG. 9, the first yoke part 910 may include a first yoke 911 and a second yoke 914 disposed to correspond to respective areas divided with reference to the center of the first magnet 241. The second yoke part 920 may include a third yoke 921 and a fourth yoke 924 disposed to correspond to respective areas divided with reference to the center of the second magnet 243.

In an embodiment, the first to fourth yokes 911 to 924 may have a step shape. In other words, the height of the first portions 912, 915, 922, and 925 and the second portions 913, 916, 923, and 926 of the first to fourth yokes 911 to 924 may be different from each other. The height of the first portions 912, 915, 922, and 925 of the first to fourth yokes 921 to 924 from the bottom surface of the AF carrier 240 may be different from the height of the second portions 913, 916, 923, and 926 from the bottom face of the AF carrier 240. For example, the distance of the first portions 912 and 915 of the first yoke 911 and the second yoke 914 from the first magnet 241 may be a third distance 930, and the distance of the second portions 913 and 916 of the first yoke 911 and the second yoke 914 from the first magnet 241 may be a fourth distance 940. The distance of the first portions 922 and 925 of the third yoke 921 and the fourth yoke 924 from the second magnet 243 may be a third distance 930, and the distance of the second portions 923 and 926 of the third yoke 921 and the fourth yoke 924 from the second magnet 243 may be a fourth distance 940. In an embodiment, the third distance 930 may be smaller than the fourth distance 940.

In an embodiment, the first yoke 911 and the second yoke 914 may be symmetrical to each other with reference to a first axis A1 that passes through the center of the first magnet 241 and is parallel to the optical axis. The third yoke 921 and the fourth yoke 924 may be symmetrical to each other with reference to a second axis B1 that passes through the center of the second magnet 243 and is parallel to the optical axis.

In an embodiment, the first yoke 911 and the second yoke 914 may be asymmetrical to each other with reference to the first axis A1 that passes through the center of the first magnet 241 and is parallel to the optical axis, and the third yoke 921 and the fourth yoke 924 may be asymmetrical to each other with reference to the second axis B1 that passes through the center of the second magnet 243 and is parallel to the optical axis. For example, the distance between the first portion 912 of the first yoke 911 and the second portion 916 of the second yoke 914 and the first magnet 241 may be the third distance 930, and the distance between the second portion 913 of the first yoke 911 and the first portion 915 of the second yoke 914 and the first magnet 241 may be the fourth distance 940.

Figure 10:
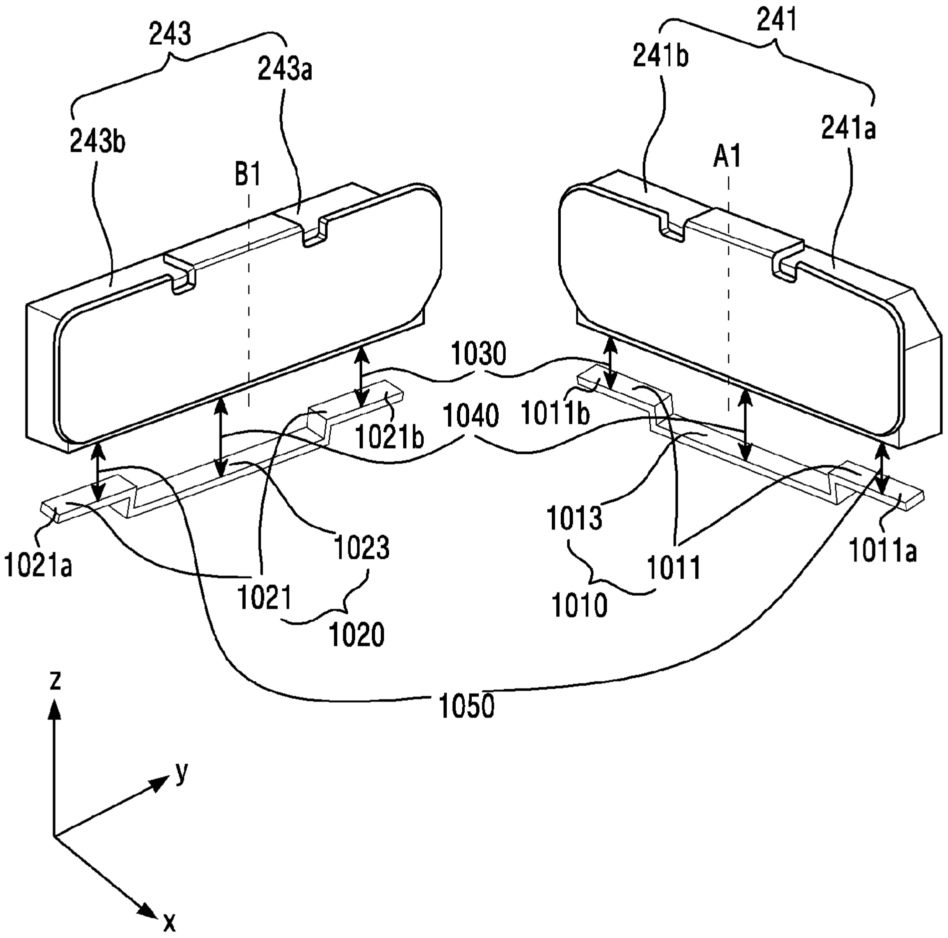
FIG. 10 illustrates a sixth shape of yokes in a camera module according to an embodiment.

FIG. 10 illustrates a sixth shape of yokes in a camera module 180 according to an embodiment.

Referring to FIG. 10, a first yoke part 1010 and a second yoke part 1020 may have a bar shape. The first yoke part 1010 and the second yoke part 1020 may form a single rod shape without being separated from each other. In an embodiment, the first yoke part 1010 and the second yoke part 1020 may have a bar shape bent a plurality of times. For example, as illustrated in FIG. 10, the first yoke part 1010 and the second yoke part 1020 may be bent four times to have a concave central portion. In an embodiment, the central portion 1013 of the first yoke part 1010 may have a second distance 1040 from the first magnet 241, and the end portions 1011 of the first yoke part 1010 may have a first distance 1030 from the first magnet 241. The central portion 1023 of the second yoke part 1020 may have a second distance 1040 from the second magnet 243, and the end portions 1021 of the second yoke part 1020 may have a first distance 1030 from the second magnet. In an embodiment, the second distance 1040 may be greater than the first distance 1030.

In an embodiment, the first yoke part 1010 and the second yoke part 1020 may include a step. The first yoke part 1010 may include a central portion 1013 formed by the step by a first length to the opposite sides in the longitudinal direction from the first axis A1, and end portions 1011 other than the central portion 1013. The second yoke part 1020 may include a central portion 1023 formed by the step by a first length to the opposite sides in the longitudinal direction from the second axis B1, and end portions 1021 other than the central portion 1023. The central portions 1013 and 1023 may have a second distance 1040 from the corresponding magnets 241 and 243, respectively, and the end portions 1011 and 1021 may have a first distance 1030 from the corresponding magnets 241 and 243, respectively. The second distance 1040 may be greater than the first distance 1030. In the embodiment of FIG. 10, the first axis A1 may be understood as an axis that passes through the center of the first magnet 241 and is parallel to the optical axis, or as an axis that passes through the center of the first yoke part 1010 and is parallel to the optical axis. In addition, the second axis B1 may be understood as an axis that passes through the center of the second magnet 243 and is parallel to the optical axis, or as an axis that passes through the center of the second yoke part 1020 and is parallel to the optical axis.

In an embodiment, the first yoke part 1010 may include end portions 1011 spaced apart from the first magnet 241 by a first distance 1030 and a central portion 1013 spaced apart from the first magnet 241 by a second distance 1040. The second yoke part 1020 may include end portions 1021 spaced apart from the second magnet 243 by the first distance 1030 and a central portion 1023 spaced apart from the second magnet 243 by the second distance 1040. The second distance 1040 may be greater than the first distance 1030.

In an embodiment, the end portions 1011 of the first yoke part 1010 may include a first end portion 1011*a* and a second end portion 1011*b* having different distances from the first magnet 241. For example, the first yoke part 1010 may include a first end portion 1011*a* spaced apart from the first magnet 241 by a third distance 1050, a second end portion 1011*b* spaced apart from the first magnet 241 by the first distance 1030, and a central portion 1013 spaced apart from the first magnet 241 by the second distance 1040. In an embodiment, the end portions 1021 of the second yoke part 1020 may include a first end portion 1021*a* and a second end portion 1021*b* having different distances from the second magnet 243. For example, the second yoke part 1020 may include a first end portion 1021*a* spaced apart from the second magnet 243 by the third distance 1050, a second end portion 1021*b* spaced apart from the second magnet 243 by the first distance 1030, and a central portion 1023 spaced apart from the second magnet 243 by the second distance 1040. In an embodiment, the second distance 1040 may be greater than the first distance 1030, and the first distance 1030 may be greater than the third distance 1050.

In an embodiment, the AF carrier 240 may include a first yoke groove in which the first yoke part 1010 is seated, and a second yoke groove in which the second yoke part 1020 is seated. The depth of at least a portion of the first yoke groove and the second yoke groove corresponding to the end portions 1011 and 1021 of the yoke parts 1010 and 1020 may be the first depth. The depth of at least a portion of the first yoke groove and the second yoke groove corresponding to the second areas 1013 and 1023 may be the second depth. The second depth may be greater than the first depth.

In an embodiment, the height of the central portions 1013 and 1023 of the first yoke part 1010 and the second yoke part 1020 from the bottom surface of the AF carrier 240 may be different from the height of the end portions 1011 and 1021 from the bottom surface of the AF carrier 240.

In an embodiment, the first yoke part 1010 may have a shape symmetrical with reference to a first axis A1 that passes through the center of the first magnet 241 and is parallel to the optical axis. The second yoke part 1020 may have a shape symmetrical with reference to a second axis B1 that passes through the center of the second magnet 243 and is parallel to the optical axis.

In an embodiment, the central portions 1013 and 1023 of the first yoke part 1010 and the second yoke part 1020 may be longer than the end portions 1011 and 1021.

Figure 11:
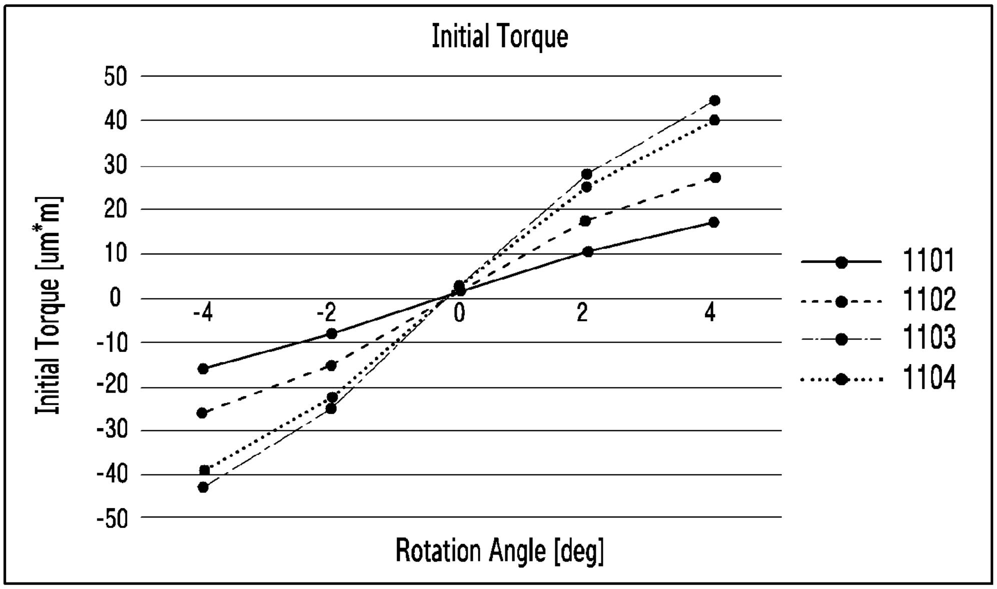
FIG. 11 is a graph illustrating an amount of initial torque according to a rotation amount of a lens assembly according to a shape of each yoke in an electronic device according to an embodiment.

FIG. 11 is a graph illustrating an amount of initial torque according to a rotation amount of a lens according to a shape of each yoke in an electronic device 100 according to an embodiment. The camera module 180 is capable of suppressing a malfunction such as exceeding of a shake correction range by the OIS carrier 230 or excessive rotation when initial torque is generated strongly.

Referring to FIG. 11, a first graph 1101 is a graph showing the amount of initial torque of the embodiment illustrated in FIG. 5 according to the rotation amount of a lens. A second graph 1102 is a graph showing the amount of initial torque of the embodiment illustrated in FIG. 6 according to the rotation amount of a lens. A third graph 1103 is a graph showing the amount of initial torque of the embodiment illustrated in FIG. 7 according to the rotation amount of a lens. A fourth graph 1104 is a graph showing the amount of initial torque of the embodiments illustrated in FIGS. 8, 9, and 10 according to the rotation amount of a lens.

In an embodiment, referring to the initial torque according to the rotation angle of the lens, the slope of the third graph 1103 is the largest, and the slopes gradually decrease in the order of the fourth graph 1104, the second graph 1102, and the first graph 1101. In other words, in the case of the embodiment illustrated in FIG. 7 corresponding to the third graph 1103, the initial torque according to the rotation amount of the lens may be the largest. In contrast, in the case of the embodiment illustrated in FIG. 5 corresponding to the first graph 1101, the initial torque according to the rotation amount of the lens may be the smallest.

In an embodiment, referring to the third graph 1103 and the fourth graph 1104 of FIG. 11, it can be seen that the initial torques of the embodiment illustrated in FIG. 7 and the embodiments illustrated in FIGS. 8 to 10 are excellent. Compared with the embodiments illustrated in FIGS. 5 and 6, through the embodiments illustrated in FIGS. 7 to 10, it is possible to more effectively suppress a malfunction such as exceeding of the vibration correction range by the OIS carrier 230 or excessive rotation.

Figure 12:
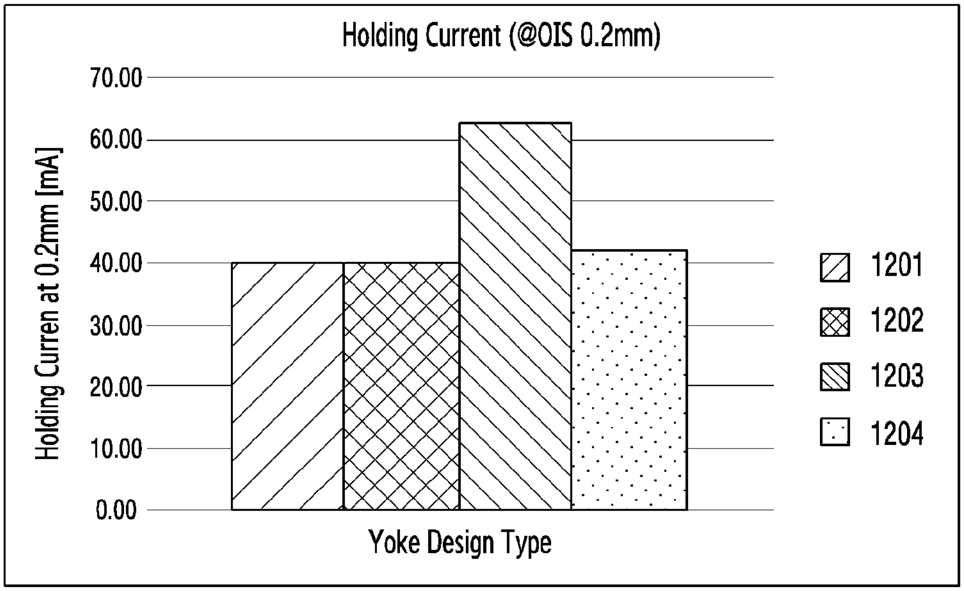
FIG. 12 is a graph illustrating a holding current according to a shape of a yoke in an electronic device according to an embodiment.

FIG. 12 is a graph illustrating a holding current according to a shape of a yoke in an electronic device 100 according to an embodiment. FIG. 12 is a graph illustrating a holding current according to a yoke shape when OIS of about 0.2 mm is performed in the camera module 180 according to an embodiment. The holding current according to the shape of the yoke may increase as the distance between a magnet (e.g., the first magnet 241) and yokes (e.g., the first yoke 251 and the second yoke 253) decreases.

Referring to FIG. 12, a first bar graph 1201 is a graph showing the holding current of the embodiment illustrated in FIG. 5. A second graph 1202 is a graph showing the amount of initial torque of the embodiment illustrated in FIG. 6. A third graph 1203 is a graph showing the amount of initial torque of the embodiment illustrated in FIG. 7. The fourth graph 1204 is a graph showing the amount of initial torque of the embodiments illustrated in FIGS. 8, 9, and 10.

Referring to FIG. 12, in the third bar graph 1203, when the camera module 180 performs OIS of about 0.2 mm, the holding current may exceed 60 mA. In the first bar graph 1201, the second bar graph 1202, and the fourth bar graph 1204, when the camera module 180 performs an OIS of about 0.2 mm, the holding current may be about 40 mA. In other words, in the case of the embodiment illustrated in FIG. 7 and corresponding to the third bar graph 1203, current consumption may be more serious than that in other embodiments. The embodiments illustrated in FIGS. 5, 6, 8 to 10 and corresponding to the first bar graph 1201, the second bar graph 1202, and the fourth bar graph 1204 have a holding current of about 40 mA and is capable of reducing the current consumption compared to the embodiment illustrated in FIG. 7.

Figure 13:
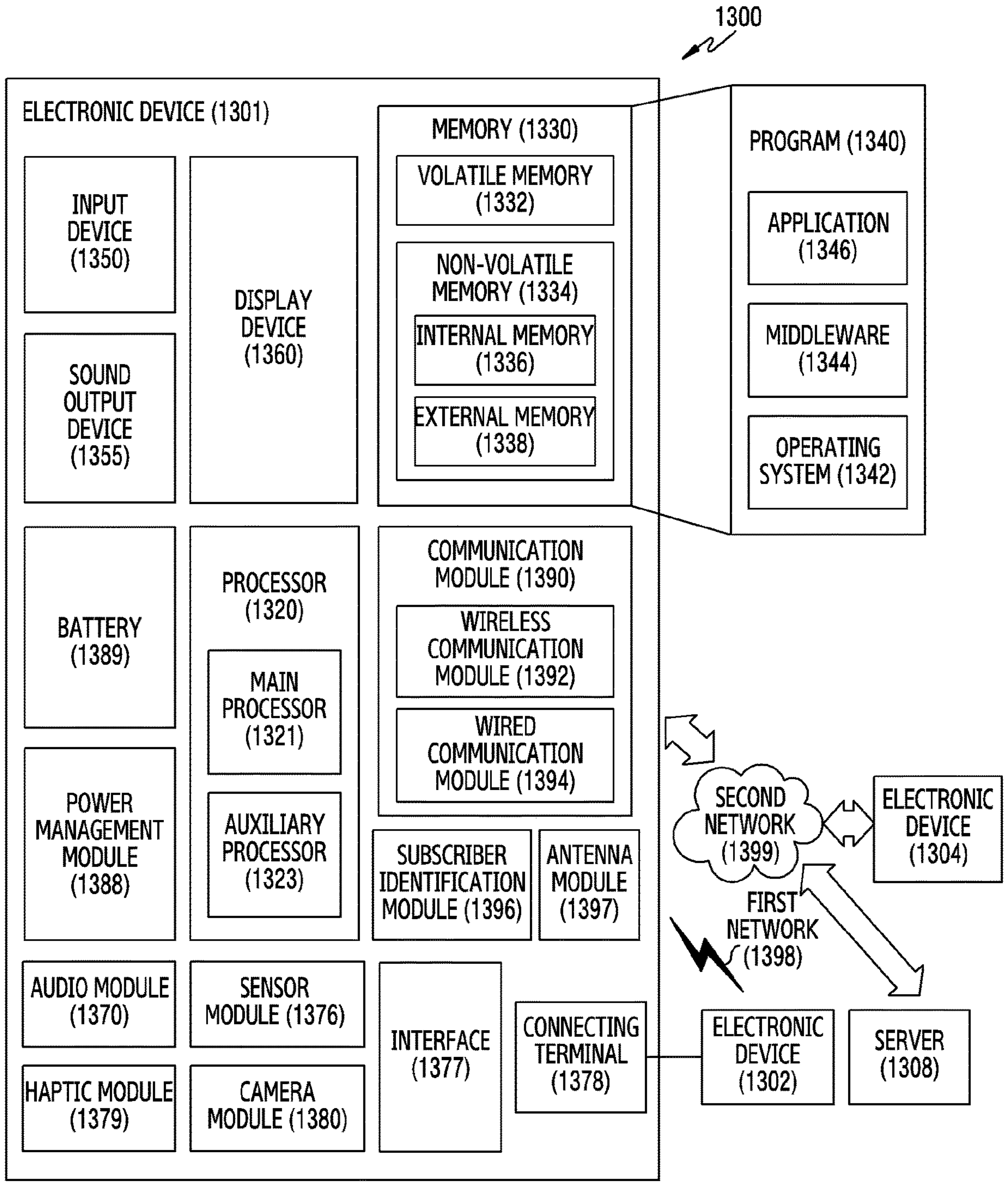
FIG. 13 is a block diagram of an electronic device according to various embodiments in a network environment.

FIG. 13 is a block diagram illustrating an electronic device 1301 in a network environment 1300 according to various embodiments. Referring to FIG. 13, the electronic device 1301 in the network environment 1300 may communicate with an electronic device 1302 via a first network 1398 (e.g., a short-range wireless communication network), or at least one of an electronic device 1304 or a server 1308 via a second network 1399 (e.g., a long-range wireless communication network). According to an embodiment, the electronic device 1301 may communicate with the electronic device 1304 via the server 1308. According to an embodiment, the electronic device 1301 may include a processor 1320, memory 1330, an input module 1350, a sound output module 1355, a display module 1360, an audio module 1370, a sensor module 1376, an interface 1377, a connecting terminal 1378, a haptic module 1379, a camera module 1380, a power management module 1388, a battery 1389, a communication module 1390, a subscriber identification module (SIM) 1396, or an antenna module 1397. In some embodiments, at least one of the components (e.g., the connecting terminal 1378) may be omitted from the electronic device 1301, or one or more other components may be added in the electronic device 1301. In some embodiments, some of the components (e.g., the sensor module 1376, the camera module 1380, or the antenna module 1397) may be implemented as a single component (e.g., the display module 1360).

The processor 1320 may execute, for example, software (e.g., a program 1340) to control at least one other component (e.g., a hardware or software component) of the electronic device 1301 coupled with the processor 1320, and may perform various data processing or computation. According to an embodiment, as at least part of the data processing or computation, the processor 1320 may store a command or data received from another component (e.g., the sensor module 1376 or the communication module 1390) in volatile memory 1332, process the command or the data stored in the volatile memory 1332, and store resulting data in non-volatile memory 1334. According to an embodiment, the processor 1320 may include a main processor 1321 (e.g., a central processing unit (CPU) or an application processor (AP)), or an auxiliary processor 1323 (e.g., a graphics processing unit (GPU), a neural processing unit (NPU), an image signal processor (ISP), a sensor hub processor, or a communication processor (CP)) that is operable independently from, or in conjunction with, the main processor 1321. For example, when the electronic device 1301 includes the main processor 1321 and the auxiliary processor 1323, the auxiliary processor 1323 may be adapted to consume less power than the main processor 1321, or to be specific to a specified function. The auxiliary processor 1323 may be implemented as separate from, or as part of the main processor 1321.

The auxiliary processor 1323 may control at least some of functions or states related to at least one component (e.g., the display module 1360, the sensor module 1376, or the communication module 1390) among the components of the electronic device 1301, instead of the main processor 1321 while the main processor 1321 is in an inactive (e.g., sleep) state, or together with the main processor 1321 while the main processor 1321 is in an active state (e.g., executing an application). According to an embodiment, the auxiliary processor 1323 (e.g., an image signal processor or a communication processor) may be implemented as part of another component (e.g., the camera module 1380 or the communication module 1390) functionally related to the auxiliary processor 1323. According to an embodiment, the auxiliary processor 1323 (e.g., the neural processing unit) may include a hardware structure specified for artificial intelligence model processing. An artificial intelligence model may be generated by machine learning. Such learning may be performed, e.g., by the electronic device 1301 where the artificial intelligence is performed or via a separate server (e.g., the server 1308). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 1330 may store various data used by at least one component (e.g., the processor 1320 or the sensor module 1376) of the electronic device 1301. The various data may include, for example, software (e.g., the program 1340) and input data or output data for a command related thererto. The memory 1330 may include the volatile memory 1332 or the non-volatile memory 1334.

The program 1340 may be stored in the memory 1330 as software, and may include, for example, an operating system (OS) 1342, middleware 1344, or an application 1346.

The input module 1350 may receive a command or data to be used by another component (e.g., the processor 1320) of the electronic device 1301, from the outside (e.g., a user) of the electronic device 1301. The input module 1350 may include, for example, a microphone, a mouse, a keyboard, a key (e.g., a button), or a digital pen (e.g., a stylus pen).

The sound output module 1355 may output sound signals to the outside of the electronic device 1301. The sound output module 1355 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 1360 may visually provide information to the outside (e.g., a user) of the electronic device 1301. The display module 1360 may include, for example, a display, a hologram device, or a projector and control circuitry to control a corresponding one of the display, hologram device, and projector. According to an embodiment, the display module 1360 may include a touch sensor adapted to detect a touch, or a pressure sensor adapted to measure the intensity of force incurred by the touch.

The audio module 1370 may convert a sound into an electrical signal and vice versa. According to an embodiment, the audio module 1370 may obtain the sound via the input module 1350, or output the sound via the sound output module 1355 or a headphone of an external electronic device (e.g., an electronic device 1302) directly (e.g., wiredly) or wirelessly coupled with the electronic device 1301.

The sensor module 1376 may detect an operational state (e.g., power or temperature) of the electronic device 1301 or an environmental state (e.g., a state of a user) external to the electronic device 1301, and then generate an electrical signal or data value corresponding to the detected state. According to an embodiment, the sensor module 1376 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1377 may support one or more specified protocols to be used for the electronic device 1301 to be coupled with the external electronic device (e.g., the electronic device 1302) directly (e.g., wiredly) or wirelessly. According to an embodiment, the interface 1377 may include, for example, a high definition multimedia interface (HDMI), a universal serial bus (USB) interface, a secure digital (SD) card interface, or an audio interface.

A connecting terminal 1378 may include a connector via which the electronic device 1301 may be physically connected with the external electronic device (e.g., the electronic device 1302). According to an embodiment, the connecting terminal 1378 may include, for example, a HDMI connector, a USB connector, a SD card connector, or an audio connector (e.g., a headphone connector).

The haptic module 1379 may convert an electrical signal into a mechanical stimulus (e.g., a vibration or a movement) or electrical stimulus which may be recognized by a user via his tactile sensation or kinesthetic sensation. According to an embodiment, the haptic module 1379 may include, for example, a motor, a piezoelectric element, or an electric stimulator.

The camera module 1380 may capture a still image or moving images. According to an embodiment, the camera module 1380 may include one or more lenses, image sensors, image signal processors, or flashes.

The power management module 1388 may manage power supplied to the electronic device 1301. According to one embodiment, the power management module 1388 may be implemented as at least part of, for example, a power management integrated circuit (PMIC).

The battery 1389 may supply power to at least one component of the electronic device 1301. According to an embodiment, the battery 1389 may include, for example, a primary cell which is not rechargeable, a secondary cell which is rechargeable, or a fuel cell.

The communication module 1390 may support establishing a direct (e.g., wired) communication channel or a wireless communication channel between the electronic device 1301 and the external electronic device (e.g., the electronic device 1302, the electronic device 1304, or the server 1308) and performing communication via the established communication channel. The communication module 1390 may include one or more communication processors that are operable independently from the processor 1320 (e.g., the application processor (AP)) and supports a direct (e.g., wired) communication or a wireless communication. According to an embodiment, the communication module 1390 may include a wireless communication module 1392 (e.g., a cellular communication module, a short-range wireless communication module, or a global navigation satellite system (GNSS) communication module) or a wired communication module 1394 (e.g., a local area network (LAN) communication module or a power line communication (PLC) module). A corresponding one of these communication modules may communicate with the external electronic device via the first network 1398 (e.g., a short-range communication network, such as Bluetooth™, wireless-fidelity (Wi-Fi) direct, or infrared data association (IrDA)) or the second network 1399 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 1392 may identify and authenticate the electronic device 1301 in a communication network, such as the first network 1398 or the second network 1399, using subscriber information (e.g., international mobile subscriber identity (IMSI)) stored in the subscriber identification module 1396.

The wireless communication module 1392 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 1392 may support a high-frequency band (e.g., the mmWave band) to achieve, e.g., a high data transmission rate. The wireless communication module 1392 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 1392 may support various requirements specified in the electronic device 1301, an external electronic device (e.g., the electronic device 1304), or a network system (e.g., the second network 1399). According to an embodiment, the wireless communication module 1392 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 1397 may transmit or receive a signal or power to or from the outside (e.g., the external electronic device) of the electronic device 1301. According to an embodiment, the antenna module 1397 may include an antenna including a radiating element composed of a conductive material or a conductive pattern formed in or on a substrate (e.g., a printed circuit board (PCB)). According to an embodiment, the antenna module 1397 may include a plurality of antennas (e.g., array antennas). In such a case, at least one antenna appropriate for a communication scheme used in the communication network, such as the first network 1398 or the second network 1399, may be selected, for example, by the communication module 1390 (e.g., the wireless communication module 1392) from the plurality of antennas. The signal or the power may then be transmitted or received between the communication module 1390 and the external electronic device via the selected at least one antenna. According to an embodiment, another component (e.g., a radio frequency integrated circuit (RFIC)) other than the radiating element may be additionally formed as part of the antenna module 1397.

According to various embodiments, the antenna module 1397 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 1301 and the external electronic device 1304 via the server 1308 coupled with the second network 1399. Each of the electronic devices 1302 or 1304 may be a device of a same type as, or a different type, from the electronic device 1301. According to an embodiment, all or some of operations to be executed at the electronic device 1301 may be executed at one or more of the external electronic devices 1302, 1304, or 1308. For example, if the electronic device 1301 should perform a function or a service automatically, or in response to a request from a user or another device, the electronic device 1301, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 1301. The electronic device 1301 may provide the outcome, with or without further processing of the outcome, as at least part of a reply to the request. To that end, a cloud computing, distributed computing, mobile edge computing (MEC), or client-server computing technology may be used, for example. The electronic device 1301 may provide ultra low-latency services using, e.g., distributed computing or mobile edge computing. In another embodiment, the external electronic device 1304 may include an internet-of-things (IoT) device. The server 1308 may be an intelligent server using machine learning and/or a neural network. According to an embodiment, the external electronic device 1304 or the server 1308 may be included in the second network 1399. The electronic device 1301 may be applied to intelligent services (e.g., smart home, smart city, smart car, or health-care) based on 5G communication technology or IoT-related technology.

Figure 14:
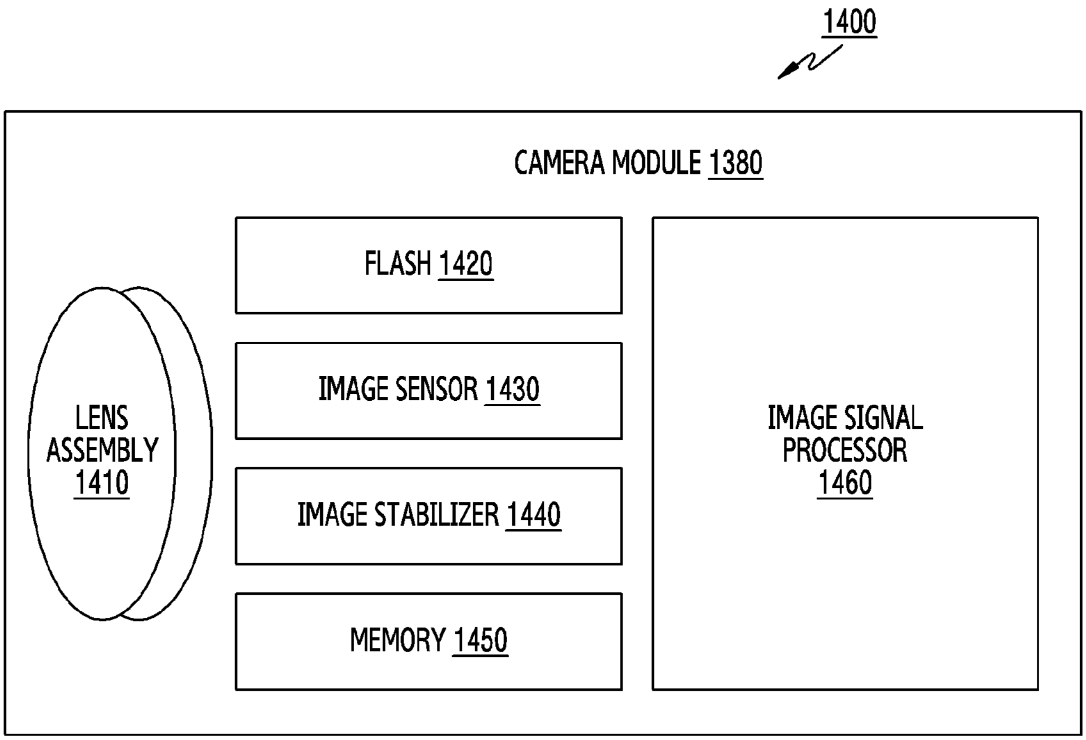
FIG. 14 is a block diagram exemplifying a camera module according to various embodiments.

FIG. 14 is a block diagram 1400 illustrating the camera module 1380 according to various embodiments. Referring to FIG. 14, the camera module 1380 may include a lens assembly 1410, a flash 1420, an image sensor 1430, an image stabilizer 1440, memory 1450 (e.g., buffer memory), or an image signal processor 1460. The lens assembly 1410 may collect light emitted or reflected from an object whose image is to be taken. The lens assembly 1410 may include one or more lenses. According to an embodiment, the camera module 1380 may include a plurality of lens assemblies 1410. In such a case, the camera module 1380 may form, for example, a dual camera, a 360-degree camera, or a spherical camera. Some of the plurality of lens assemblies 1410 may have the same lens attribute (e.g., view angle, focal length, auto-focusing, f number, or optical zoom), or at least one lens assembly may have one or more lens attributes different from those of another lens assembly. The lens assembly 1410 may include, for example, a wide-angle lens or a telephoto lens.

The flash 1420 may emit light that is used to reinforce light reflected from an object. According to an embodiment, the flash 1420 may include one or more light emitting diodes (LEDs) (e.g., a red-green-blue (RGB) LED, a white LED, an infrared (IR) LED, or an ultraviolet (UV) LED) or a xenon lamp. The image sensor 1430 may obtain an image corresponding to an object by converting light emitted or reflected from the object and transmitted via the lens assembly 1410 into an electrical signal. According to an embodiment, the image sensor 1430 may include one selected from image sensors having different attributes, such as a RGB sensor, a black-and-white (BW) sensor, an IR sensor, or a UV sensor, a plurality of image sensors having the same attribute, or a plurality of image sensors having different attributes. Each image sensor included in the image sensor 1430 may be implemented using, for example, a charged coupled device (CCD) sensor or a complementary metal oxide semiconductor (CMOS) sensor.

The image stabilizer 1440 may move the image sensor 1430 or at least one lens included in the lens assembly 1410 in a particular direction, or control an operational attribute (e.g., adjust the read-out timing) of the image sensor 1430 in response to the movement of the camera module 1380 or the electronic device 1301 including the camera module 1380. This allows compensating for at least part of a negative effect (e.g., image blurring) by the movement on an image being captured. According to an embodiment, the image stabilizer 1440 may sense such a movement by the camera module 1380 or the electronic device 1301 using a gyro sensor or an acceleration sensor disposed inside or outside the camera module 1380. According to an embodiment, the image stabilizer 1440 may be implemented, for example, as an optical image stabilizer.

The memory 1450 may store, at least temporarily, at least part of an image obtained via the image sensor 1430 for a subsequent image processing task. For example, if image capturing is delayed due to shutter lag or multiple images are quickly captured, a raw image obtained (e.g., a Bayer-patterned image, a high-resolution image) may be stored in the memory 1450, and its corresponding copy image (e.g., a low-resolution image) may be previewed via the display module 1360. Thereafter, if a specified condition is met (e.g., by a user's input or system command), at least part of the raw image stored in the memory 1450 may be obtained and processed, for example, by the image signal processor 1460. According to an embodiment, the memory 1450 may be configured as at least part of the memory 1330 or as a separate memory that is operated independently from the memory 1330.

The image signal processor 1460 may perform one or more image processing with respect to an image obtained via the image sensor 1430 or an image stored in the memory 1450. The one or more image processing may include, for example, depth map generation, three-dimensional (3D) modeling, panorama generation, feature point extraction, image synthesizing, or image compensation (e.g., noise reduction, resolution adjustment, brightness adjustment, blurring, sharpening, or softening). Additionally or alternatively, the image signal processor 1460 may perform control (e.g., exposure time control or read-out timing control) with respect to at least one (e.g., the image sensor 1430) of the components included in the camera module 1380. An image processed by the image signal processor 1460 may be stored back in the memory 1450 for further processing, or may be provided to an external component (e.g., the memory 1330, the display module 1360, the electronic device 1302, the electronic device 1304, or the server 1308) outside the camera module 1380. According to an embodiment, the image signal processor 1460 may be configured as at least part of the processor 1320, or as a separate processor that is operated independently from the processor 1320. If the image signal processor 1460 is configured as a separate processor from the processor 1320, at least one image processed by the image signal processor 1460 may be displayed, by the processor 1320, via the display module 1360 as it is or after being further processed.

According to an embodiment, the electronic device 1301 may include a plurality of camera modules 1380 having different attributes or functions. In such a case, at least one of the plurality of camera modules 1380 may form, for example, a wide-angle camera and at least another of the plurality of camera modules 1380 may form a telephoto camera. Similarly, at least one of the plurality of camera modules 1380 may form, for example, a front camera and at least another of the plurality of camera modules 1380 may form a rear camera.

In an embodiment, an electronic device (e.g., the electronic device 100) may include a housing (e.g., the housing 113) and a lens assembly (e.g., the lens assembly 111) disposed in the housing along an optical axis. The electronic device 100 may include a first carrier (e.g., the AF carrier 240) operatively connected to the lens assembly 111 to move the lens assembly 111 within the housing 113 in an optical axis direction, wherein the first carrier may include a first yoke part (e.g., the first yoke part 250) and a second yoke part (e.g., the second yoke part 254). The electronic device 100 may include a second carrier 230 (e.g., the OIS carrier) operatively connected to the lens assembly 111 to move the lens assembly 111 within the housing 113 in a direction perpendicular to the optical axis, wherein the second carrier may include a first magnet (e.g., the first magnet 241) interacting with the first yoke part 250 and a second magnet (e.g., a second magnet 243) interacting with the second yoke part 254. The electronic device 100 may include a plurality of balls (e.g., the balls 270) disposed between the first carrier 240 and the second carrier 230. The first carrier 240 may include a plurality of guide grooves (e.g., the guide grooves 271) in which the plurality of balls 270 are accommodated, respectively. The plurality of balls 270 may each be in contact with an upper end of the first carrier 240 and a lower end of the second carrier 230, and each of the plurality of ball may be movable within a respective guide groove of the plurality of guide grooves 271.

In an embodiment, when viewed in an optical axis direction, the first yoke part 250 may be disposed to overlap the first magnet 241, and the second yoke part 254 may be disposed to overlap the second magnet 243.

In an embodiment, the first yoke part (e.g., the first yoke part 1010) may include a first area (e.g., the distal end portion 1011) spaced apart from the first magnet 241 by a first distance 1030 and a second area (e.g., the central portion 1013) spaced apart from the first magnet 241 by a second distance 1040 that is different from the first distance 1030. The first distance 1030 may be smaller than the second distance 1040.

In an embodiment, the first carrier 240 may include a first yoke groove in which the first yoke part 250 is seated, and a second yoke groove in which the second yoke part 254 is seated. The depth of at least a portion of the first yoke groove corresponding to the first area of the first yoke part 250 is a first depth, and the depth of at least a portion of the first yoke groove corresponding to the second area is a second depth that is greater than the first depth.

In an embodiment, the first yoke part 250 may include a first yoke (e.g., the first yoke 251) and a second yoke (e.g., the second yoke 253) disposed separately from the first yoke 251. The second yoke part 254 may include a third yoke (e.g., the third yoke 255) and a fourth yoke (e.g., the fourth yoke 257) disposed separately from the third yoke 255.

In an embodiment, a central area of the first yoke (e.g., the first yoke 611 or 711) and a central area of the second yoke (e.g., the second yoke 613 or 713) may protrude in a first direction, and opposite end areas of the first yoke 611 or 711 and opposite end areas of the second yoke 613 or 713 may protrude in a second direction opposite to the first direction.

In an embodiment, the first yoke part (e.g., the first yoke part 810) may include a first yoke (e.g., the first yoke 811) and a second yoke (e.g., the second yoke 814) disposed separately from the first yoke 811, and the first yoke 811 and the second yoke 814 may form a T-shape.

In an embodiment, the first yoke 811 and the second yoke 814 may include portions having a first width and corresponding to opposite ends of the first magnet 241 and portions having a second width and corresponding to portions other than the opposite ends of the first magnet, wherein the second width may be smaller than the first width.

In an embodiment, the first yoke part (e.g., the first yoke part 910) may include a first yoke (e.g., the first yoke 911) and a second yoke (e.g., the second yoke 914) disposed separately from the first yoke 911, and the first yoke 911 and the second yoke 914 may each include a step. The first yoke 911 and the second yoke 914 may each include a third area (e.g., the first portion 912 or 915) formed by the step and located at a third distance (e.g., the third distance 930) from the first magnet 241 and a fourth area (e.g., a second portion 913 or 916) formed by the step and located at a fourth distance (e.g., a fourth distance 940) from the first magnet 241. The third distance 930 may be smaller than the fourth distance 940.

In an embodiment, the first yoke 911 and the second yoke 914 may be disposed to face each other with reference to the center of the first magnet 241.

In an embodiment, the lens assembly 111 may be movable in a plane direction perpendicular to an optical axis direction via the plurality of balls 270. When the lens assembly 111 rotates in the first rotation direction, the first yoke part 250 and the second yoke part 254 may rotate the lens assembly 111 in a second rotation direction opposite to the first rotation direction.

In an embodiment, the plurality of balls 270 may have a spherical shape with a first diameter, and the plurality of guide grooves 271 may have at least one of a circular shape or a hemispherical shape having a second diameter greater than the first diameter.

In an embodiment, the plurality of guide grooves 271 may be provided at least in the corner portions of the first carrier 240.

In an embodiment, the second carrier 230, the plurality of balls 270, and the first carrier 240 may be stacked in order in an optical axis direction.

In an embodiment, the plurality of guide grooves 271 may be at least provided in the corner portions of the first carrier 240, and the plurality of balls 270 accommodated in the plurality of guide grooves 271 may be disposed at least on the bottom surface of the second carrier 230.

In an embodiment, a camera module (e.g., the camera module 180 and/or the camera module 1380) may include a housing (e.g., the housing 113), a lens assembly (e.g., the lens assembly 111) disposed in the housing along an optical axis, a first carrier (e.g., the AF carrier 240) including a first yoke part (e.g., the first yoke part 250) and a second yoke part (e.g., the second yoke part 254), and a second carrier (e.g., the OIS carrier 230) accommodating the lens assembly 111 and including a first magnet (e.g., the first magnet 241) interacting with the first yoke part 250 and a second magnet (e.g., the second magnet 243) interacting with the second yoke part 254. The camera module 180 may include a plurality of balls (e.g., the balls 270) disposed between the first carrier 240 and the second carrier 230. The second carrier 230, the plurality of balls 270, and the first carrier 240 may be stacked in order in an optical axis direction. The first carrier 240 may include a plurality of guide grooves (e.g., the guide grooves 271) in which the plurality of balls 270 are accommodated, respectively. Each of the plurality of balls 270 may be movable within a respective guide groove of the plurality of guide grooves 271.

In an embodiment, when viewed in an optical axis direction, the first yoke part 250 may be disposed to overlap the first magnet 241, and the second yoke part 254 may be disposed to overlap the second magnet 243.

In an embodiment, the first yoke part (e.g., the first yoke part 1010) may include a first area (e.g., the distal end portion 1011) spaced apart from the first magnet 241 by a first distance 1030 and a second area (e.g., the central portion 1013) spaced apart from the first magnet 241 by a second distance 1040 that is different from the first distance. The first carrier 240 may include a first yoke groove in which the first yoke part 1010 is seated, and a second yoke groove in which the second yoke part (e.g., the second yoke part 1020) is seated.

In an embodiment, a first depth of at least a portion of the first yoke groove corresponding to the end portions 1011 of the first yoke part 1010 is a first depth, and a second depth of at least a portion of the second yoke groove corresponding to the central portion 1013 is a second depth that is greater than the first depth.

In an embodiment, the first yoke part (e.g., the first yoke part 610 or 710) may include a first yoke (e.g., the first yoke 611 or 711) and a second yoke (e.g., the second yoke 613 or 713) disposed separately from the first yoke 611 or 711. A central area of the first yokes 611 or 711 and a central area of the second yoke 613 or 713 protrude in a first direction, and opposite end areas of the first yoke 611 or 711 and opposite ends of the second yoke 613 or 713 may protrude in a second direction opposite to the first direction.

In an embodiment, the first yoke part (e.g., the first yoke part 810) may include a first yoke (e.g., the first yoke 811) and a second yoke (e.g., the second yoke 814) disposed separately from the first yoke 811, and the first yoke 811 and the second yoke 814 may form a T-shape. The first yoke 811 and the second yoke 814 may include portions (e.g., wide portions 813 and 816) having a first width and corresponding to the opposite ends of the first magnet 241 and portions (e.g., the narrow portions 812 and 815) having a second width and corresponding to portions other than the opposite ends. The second width may be smaller than the first width.

In an embodiment, the first yoke part (e.g., the first yoke part 910) may include a first yoke (e.g., the first yoke 911) and a second yoke (e.g., the second yoke 914) disposed separately from the first yoke 911, and the first yoke 911 and the second yoke 914 may each have a step. The first yoke 911 and the second yoke 914 may each include a third area (e.g., the first portion 912 or 915) formed by the step and located at a third distance 930 from the first magnet 241 and a fourth area (e.g., a second portion 913 or 916) formed by the step and located at a fourth distance 940 from the first magnet 241. The third distance 930 may be smaller than the fourth distance 940.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 1340) including one or more instructions that are stored in a storage medium (e.g., internal memory 1336 or external memory 1338) that is readable by a machine (e.g., the electronic device 1301). For example, a processor (e.g., the processor 1320) of the machine (e.g., the electronic device 1301) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Although the present disclosure has been described with various embodiments, various changes and modifications may be suggested to one skilled in the art. It is intended that the present disclosure encompass such changes and modifications as fall within the scope of the appended claims.

What is claimed is:

1. An electronic device comprising:

a housing;

a lens assembly disposed in the housing along an optical axis;

a first carrier operatively connected to the lens assembly and configured to move the lens assembly within the housing in the optical axis direction, wherein the first carrier includes a first yoke part and a second yoke part;

a second carrier operatively connected to the lens assembly to move the lens assembly within the housing in a direction perpendicular to the optical axis, wherein the second carrier includes:

a first magnet configured to interact with the first yoke part, and a second magnet configured to interact with the second yoke part; and a plurality of balls disposed between the first carrier and the second carrier, wherein the first carrier includes a plurality of guide grooves configured to accommodate the plurality of balls, wherein the plurality of balls are each in contact with an upper end of the first carrier and a lower end of the second carrier, and each of the plurality of balls are movable within a respective guide groove of the plurality of guide grooves, wherein the first yoke part is a monolithic component with contiguous portions including a first portion spaced apart from the first magnet by a first minimum distance and a second portion spaced apart from the first magnet by a second minimum distance that is different from the first minimum distance, the first minimum distance and the second minimum distance extending along the optical axis, the second portion connected directly from the first portion, wherein the first portion of the first yoke part faces the first magnet along the optical axis, wherein the second portion of the first yoke part faces the first magnet along the optical axis, wherein a single continuous surface of the first magnet faces the first portion of the first yoke part spaced apart from the surface of the first magnet by the first minimum distance and the second portion of the first yoke part spaced apart from the surface of the first magnet by the second minimum distance different from the first minimum distance and connected directly from the first portion of the first yoke part along the optical axis, both of the first minimum distance and the second distances measured along the optical axis to the single continuous surface of the first magnet.

2. The electronic device of claim 1, wherein:

when viewed in an optical axis direction, the first yoke part is disposed to overlap the first magnet, and the second yoke part is disposed to overlap the second magnet.

3. The electronic device of claim 2, wherein the first minimum distance is smaller than the second minimum distance.

4. The electronic device of claim 1, wherein:

the first yoke part includes a first yoke and a second yoke disposed separately from the first yoke, and the second yoke part includes a third yoke and a fourth yoke disposed separately from the third yoke.

5. The electronic device of claim 1, wherein:

the first yoke part includes a first yoke and a second yoke disposed separately from the first yoke, the first yoke and the second yoke each include a step, and the first yoke and the second yoke each include:

the first portion formed by the step, the second portion formed by the step, and wherein the second minimum distance is larger than the first minimum distance.

6. The electronic device of claim 5, wherein the first yoke and the second yoke are disposed to face each other with reference to a first axis passing through a center of the first magnet and parallel to the optical axis.

7. The electronic device of claim 1, wherein:

the lens assembly is configured to move in a plane direction perpendicular to an optical axis direction via the plurality of balls, and when the lens assembly rotates in a first rotation direction, the first yoke part and the second yoke part are configured to rotate the lens assembly in a second rotation direction opposite to the first rotation direction.

8. The electronic device of claim 7, wherein:

the plurality of guide grooves are at least provided in corner portions of the first carrier, and the plurality of balls accommodated in the plurality of guide grooves are disposed at least on a bottom surface of the second carrier.

9. The electronic device of claim 1, wherein:

the plurality of balls have a spherical shape with a first diameter, and the plurality of guide grooves have at least one of a circular shape or a hemispherical shape with a second diameter greater than the first diameter.

10. The electronic device of claim 1, wherein the plurality of guide grooves are provided at least in corner portions of the first carrier.

11. The electronic device of claim 1, wherein the second carrier, the plurality of balls, and the first carrier are stacked in order in an optical axis direction.

12. A camera module comprising:

a housing;

a lens assembly disposed in the housing along an optical axis;

a first carrier including a first yoke part and a second yoke part;

a second carrier configured to accommodate the lens assembly and including:

a first magnet configured to interact with the first yoke part, and a second magnet configured to interact with the second yoke part; and a plurality of balls disposed between the first carrier and the second carrier, wherein the second carrier, the plurality of balls, and the first carrier are stacked in order in the optical axis direction, wherein the first carrier includes a plurality of guide grooves in which the plurality of balls are accommodated, respectively, and each of the plurality of balls moves within a respective guide groove of the plurality of guide grooves, wherein the first yoke part is a monolithic component with contiguous portions including a first portion spaced apart from the first magnet by a first minimum distance and a second portion spaced apart from the first magnet by a second minimum distance that is different from the first minimum distance, the first minimum distance and the second minimum distance extending along the optical axis, the second portion connected directly from the first portion, wherein the first portion of the first yoke part faces the first magnet along the optical axis, wherein the second portion of the first yoke part faces the first magnet along the optical axis, and wherein a single continuous surface of the first magnet faces the first portion of the first yoke part spaced apart from the surface of the first magnet by the first minimum distance and the second portion of the first yoke part spaced apart from the surface of the first magnet by the second minimum distance different from the first minimum distance and connected directly from the first portion of the first yoke part along the optical axis, both of the first minimum distance and the second distances measured along the optical axis to the single continuous surface of the first magnet.

13. The camera module of claim 12, wherein:

when viewed in an optical axis direction, the first yoke part is disposed to overlap the first magnet, and the second yoke part is disposed to overlap the second magnet.

14. The camera module of claim 12, wherein:

the first yoke part includes a first yoke and a second yoke disposed separately from the first yoke, the first yoke and the second yoke each include a step, the first yoke and the second yoke include the first portion and the second portion formed by the step, and the first minimum distance is smaller than the second minimum distance.

* * * * *